(12) United States Patent
Yoshida et al.

(10) Patent No.: US 11,746,445 B2
(45) Date of Patent: Sep. 5, 2023

(54) CARBON FIBER BUNDLE, PREPREG, AND FIBER-REINFORCED COMPOSITE MATERIAL

(71) Applicants: Teijin Limited, Osaka (JP); Teijin Carbon Europe GmbH, Wuppertal (DE)

(72) Inventors: Shuhei Yoshida, Osaka (JP); Hidekazu Yoshikawa, Osaka (JP); Yosuke Nakamura, Osaka (JP); Hironori Kawamoto, Osaka (JP); Takaya Suzuki, Osaka (JP); Toru Kaneko, Osaka (JP)

(73) Assignees: TEIJIN LIMITED, Osaka (JP); Teijin Carbon Europe GmbH, Wuppertal (DE)

( * ) Notice: Subject to any disclaimer, the term of this patent is extended or adjusted under 35 U.S.C. 154(b) by 0 days.

(21) Appl. No.: 17/943,658

(22) Filed: Sep. 13, 2022

(65) Prior Publication Data
US 2023/0017814 A1  Jan. 19, 2023

Related U.S. Application Data

(62) Division of application No. 16/768,370, filed as application No. PCT/JP2018/043220 on Nov. 22, 2018.

(30) Foreign Application Priority Data

Dec. 1, 2017 (JP) .................. 2017-231749
Nov. 2, 2018 (JP) .................. 2018-207301

(51) Int. Cl.
*D01F 9/22* (2006.01)
*C08J 5/24* (2006.01)

(52) U.S. Cl.
CPC .............. *D01F 9/22* (2013.01); *C08J 5/248* (2021.05); *C08J 2300/22* (2013.01); *C08J 2300/24* (2013.01)

(58) Field of Classification Search
CPC ......... Y10T 428/2913; Y10T 428/2918; Y10T 428/292; Y10T 428/2967; Y10T 428/30; C08J 5/24; C08J 5/042; C08J 5/06; C08J 2300/22; C08J 2300/24; C08J 2363/00; C08J 2363/02; D02J 1/22; D02J 1/222; D01F 11/14; D01F 9/22; D01F 9/225; D01F 6/38; D01F 6/18; D06M 13/11; C08L 63/00
USPC ........... 423/447.1, 447.8; 428/367, 364, 304, 428/408, 368
See application file for complete search history.

(56) References Cited

U.S. PATENT DOCUMENTS

| | | | |
|---|---|---|---|
| 8,124,228 | B2 | 2/2012 | Yoshikawa et al. |
| 8,674,045 | B2 | 3/2014 | Tanaka et al. |
| 2010/0252438 | A1 | 10/2010 | Yoshikawa et al. |
| 2011/0038788 | A1 | 2/2011 | Tanaka et al. |
| 2020/0385891 | A1 | 12/2020 | Yoshida et al. |
| 2020/0399789 | A1 | 12/2020 | Okuda et al. |

FOREIGN PATENT DOCUMENTS

| | | | |
|---|---|---|---|
| JP | H11217734 | * | 8/1998 |
| JP | 11-217734 A | | 8/1999 |
| JP | 2002-294568 A | | 10/2002 |
| JP | 2002-327339 A | | 11/2002 |
| JP | 2004-238761 A | | 8/2004 |
| JP | 2006-283225 A | | 10/2006 |
| JP | 2008-202207 A | | 9/2008 |
| JP | 2014-194108 A | | 10/2014 |
| JP | 5692945 B1 | | 4/2015 |
| JP | 2015-96664 A | | 5/2015 |
| JP | 2015-209605 A | | 11/2015 |
| JP | 2017-141525 A | | 8/2017 |
| JP | 2019-151956 A | | 9/2019 |
| TW | 459075 B | | 10/2001 |
| WO | 97/45576 A1 | | 12/1997 |
| WO | 2009/060653 A1 | | 5/2009 |
| WO | 2009/125832 A1 | | 10/2009 |
| WO | 2019/172247 A1 | | 9/2019 |

OTHER PUBLICATIONS

Maeda, "The Recent Trends of Carbon Fiber", CMC, 2007, p. 22, (2 pages total in translation).
European Third Party Observation dated Feb. 14, 2022 in Application No. 20180884204.1.
Japanese Third Party Observation dated Jan. 4, 2022 in Application No. 2019-119334.
International Search Report for PCT/JP2018/043220, dated Jan. 22, 2019.
International Preliminary Report on Patentability dated Jun. 2, 2020 with translation of Written Opinion of the International Searching Authority for PCT/JP2018/043220.
Communication dated Sep. 9, 2021 from the European Patent Office in Application No. 18884204.1.
Mitsubishi Chemical Corporation, "Epoxy Resin jER Products", 3 pages (undated).
Calculation with Parameters disclosed in PL1 (i.e., JP-A-11-217734 published Aug. 10, 1999), 1 page.
(Continued)

*Primary Examiner* — Camie S Thompson
(74) *Attorney, Agent, or Firm* — Sughrue Mion, PLLC

(57) ABSTRACT

An object of the present invention is to provide a carbon fiber which exhibits excellent strength development rate when used in a composite material. The present invention that solves the problems is a carbon fiber which simultaneously satisfies the following formulae (1) and (2):

$$Lc/d \leq 3 \quad (1)$$

$$TS \times d \times Lc > 6.0 \times 10^5 \quad (2)$$

wherein:
Lc is an X-ray crystallite size (Å),
d is a filament diameter (μm), and
TS is a strand tensile strength (MPa).

7 Claims, No Drawings

(56) References Cited

OTHER PUBLICATIONS

Office Action dated Dec. 6, 2022 by the Japan Patent Office in Application No. 2019-119334.
Office Action dated Oct. 4, 2022 by the Japan Patent Office in Application No. 2019-119334.

* cited by examiner

CARBON FIBER BUNDLE, PREPREG, AND FIBER-REINFORCED COMPOSITE MATERIAL

CROSS REFERENCE TO RELATED APPLICATIONS

This is a divisional application of application Ser. No. 16/768,370 filed May 29, 2020, which is a National Stage of International Application No. PCT/JP2018/043220 filed Nov. 22, 2018, claiming priority based on Japanese Patent Application No. 2017-231749 filed Dec. 1, 2017 and Japanese Patent Application No. 2018-207301 filed Nov. 2, 2018. The disclosure of application Ser. No. 16/768,370 is incorporated herein by reference in its entirety.

TECHNICAL FIELD

The present invention relates to a carbon fiber advantageously used in a composite material for aircraft and the like, and a prepreg and a fiber-reinforced composite material each using the same.

BACKGROUND ART

Carbon fibers have excellent specific strength and specific modulus and are lightweight, and therefore are used as reinforcing fibers for thermosetting and thermoplastic resins not only in conventional sporting goods and general industrial applications but also in a wide variety of applications, such as an aircraft and aerospace application and an automobile application. In recent years, a carbon fiber-reinforced composite material obtained by unifying a carbon fiber as a reinforcing fiber with a matrix resin has a further advantage over other materials, and, particularly in the applications of automobiles and aircraft and aerospace, there are increasing demands for the fiber-reinforced composite material having improved performance.

The fiber-reinforced composite material is, for example, formed from a prepreg, which is an intermediate product having a reinforcing fiber impregnated with a matrix resin, through molding and processing steps including heating and pressing. In forming a composite of a carbon fiber and a matrix resin, for achieving excellent performance of the composite, it is essential to improve the carbon fiber per se in mechanical physical properties, such as a strength and a modulus, and studies have been made on the improvement of the mechanical physical properties of the carbon fiber.

However, even when the carbon fiber having improved mechanical physical properties is used in a fiber-reinforced composite material, a difference is caused between the actually measured physical properties of the resultant fiber-reinforced composite material and the physical properties expected from the design of the composite material, and there is a problem in that the carbon fiber cannot exhibit a satisfactory development rate of physical properties when used in the composite material.

For improving the physical properties development rate of a carbon fiber when used in a composite material, various studies have been made. For example, PTL 1 discloses a method in which a carbon fiber bundle in a flattened form is employed to improve the opening properties for fiber upon forming so as to obtain a homogeneous formed article, increasing the strength development rate of the carbon fiber. Further, PTL 2 proposes a method in which treatment unevenness of the surface treatment for improving the adhesion between a carbon fiber and a matrix resin is reduced to increase the strength development rate of the carbon fiber.

However, the strength development rate of the carbon fiber obtained using these methods was not satisfactory.

CITATION LIST

Patent Literature

PTL 1: JP-A-2002-294568
PTL 2: JP-A-2015-209605

SUMMARY OF INVENTION

Technical Problem

An object of the present invention is to provide a carbon fiber which exhibits excellent strength development rate when used in a composite material, and which produces a composite material having excellent mechanical properties.

Solution to Problem

The present invention that achieves the above object is a carbon fiber which simultaneously satisfies the following formulae (1) and (2):

$$Lc/d \leq 3 \tag{1}$$

$$TS \times d \times Lc > 6.0 \times 10^5 \tag{2}$$

wherein:
Lc is an X-ray crystallite size (Å),
d is a filament diameter (μm), and
TS is a strand tensile strength (MPa).
In the invention, it is preferred that the carbon fiber further satisfies the following formula (3):

$$TS \times d \times TM > 9.5 \times 10^6 \tag{3}$$

wherein:
TS is a strand tensile strength (MPa),
d is a filament diameter (μm), and
TM is a strand tensile modulus (GPa).
The invention encompasses a prepreg which is obtained by impregnating the above-mentioned carbon fiber with a matrix resin, and a fiber-reinforced composite material.

Advantageous Effects of Invention

When the carbon fiber of the invention is used in a composite material, a fiber-reinforced composite material having excellent strength development rate of the carbon fiber and excellent mechanical properties can be obtained.

DESCRIPTION OF EMBODIMENTS

The carbon fiber of the invention is a carbon fiber which simultaneously satisfies the following formulae (1) and (2):

$$Lc/d \; 3 \tag{1}$$

$$TS \times d \times Lc > 6.0 \times 10^5 \tag{2}$$

wherein:
Lc is an X-ray crystallite size (Å),
d is a filament diameter (μm), and
TS is a strand tensile strength (MPa).
The carbon fiber satisfies both the formulae (1) and (2), and therefore a fiber-reinforced composite material having excellent strength development rate of the carbon fiber can be obtained. In the invention, it is preferred that Lc/d is less than 3.

In the invention, it is preferred that the carbon fiber further satisfies the following formula (3):

$$TS \times d \times TM > 9.5 \times 10^6 \quad (3)$$

wherein:
TS is a strand tensile strength (MPa),
d is a filament diameter (μm), and
TM is a strand tensile modulus (GPa).

When the carbon fiber further satisfies the formula (3), a fiber-reinforced composite material having more excellent strength development rate of the carbon fiber can be obtained.

In the invention, the filament diameter of the carbon fiber is preferably 4.5 to 10 μm, more preferably 6 to 9 μm, further preferably 6.5 to 8 μm. With respect to the filament diameter of the carbon fiber, a desired value can be obtained by controlling the fiber diameter of a precursor fiber. From the viewpoint of the performance of the obtained composite material, the strand tensile strength of the carbon fiber is preferably 4,700 MPa or more, more preferably 4,800 to 10,000 MPa, especially preferably 5,000 MPa or more. The strand tensile modulus of the carbon fiber is preferably 200 GPa or more, more preferably 230 to 450 GPa. Further, the X-ray crystallite size of the carbon fiber is preferably 18 to 22 Å, more preferably 19 to 21 Å. The X-ray crystal orientation degree of the carbon fiber is preferably 75% or more, more preferably 80 to 90%, especially preferably more than 81%. The specific gravity of the carbon fiber is preferably 1.7 g/cm$^3$ or more, more preferably 1.72 to 1.78 g/cm$^3$.

The above-mentioned carbon fiber of the invention exhibits excellent strength development rate when used in a composite material, and therefore, by using the carbon fiber of the invention as a reinforcing fiber for fiber-reinforced composite material, a fiber-reinforced composite material having excellent mechanical properties can be obtained.

Another embodiment of the invention is a prepreg which is obtained by impregnating the carbon fiber of the invention with a matrix resin. Still another embodiment of the invention is a fiber-reinforced composite material which comprises the carbon fiber of the invention and a matrix resin.

A further embodiment of the invention is a method for producing the above-mentioned carbon fiber of the invention. Specifically, the method for producing a carbon fiber of the invention is a method for producing a carbon fiber, wherein the method comprises the steps of: imparting a flame resistance to an acrylonitrile precursor fiber bundle to obtain an oxidized fiber (oxidization step); and subjecting the oxidized fiber to carbonization treatment in an inert atmosphere in a first carbonizing furnace, and then further subjecting the resultant fiber to carbonization treatment in an inert atmosphere in a second carbonizing furnace while applying a tension of 160 to 300 mg/dtex to the fiber (carbonization step), wherein, in the carbonization step, the temperature gradient is 300 to 600° C./min and the integral quantity of heat given to the oxidized fiber is 80 to 105 J·h/g.

The acrylonitrile precursor fiber bundle used in the invention is preferably a precursor fiber bundle having a filament diameter of 10 to 14 μm. When the filament diameter of the precursor fiber bundle is in this range, the filament diameter of the resultant carbon fiber can be in the range of from 4.5 to 10 μm, making it easy to obtain a carbon fiber which satisfies the formula (1) and the formula (2). When the fiber diameter of the precursor fiber is too small, it is likely that the filament diameter of the resultant carbon fiber is reduced to make it difficult to obtain a carbon fiber which satisfies the formula (1), so that the 0° tensile strength development rate (0TS development rate) of a composite material is lowered. When the fiber diameter of the precursor fiber is too large, it is likely that the tensile strength of the resultant carbon fiber is lowered or fiber breakages in the carbonization step are increased, making it difficult to produce a carbon fiber.

The fineness (total fineness) of the acrylonitrile precursor fiber bundle is preferably 1,000 to 10,000 tex, more preferably 1,500 to 5,000 tex. The number of filaments in the acrylonitrile precursor fiber bundle is preferably 1,000 to 100,000, more preferably 5,000 to 50,000, especially preferably 10,000 to 40,000.

In the oxidization step, the oxidization treatment is conducted until the fiber density of the obtained oxidized fiber becomes 1.34 to 1.38 g/cm$^3$. When the fiber density of the oxidized fiber is in this range, a carbon fiber having excellent tensile strength, i.e., a large TS value can be produced. When the fiber density of the oxidized fiber is too low, it is likely that fiber breakages in the carbonization step are increased, making it difficult to produce a carbon fiber. On the other hand, when the fiber density of the oxidized fiber is too high, the tensile strength of the resultant carbon fiber is likely to be lowered.

In the invention, with respect to the temperature of the first carbonizing furnace, there is no particular limitation as long as the temperature of the first carbonizing furnace is set so that the temperature gradient and integral quantity of heat throughout the carbonization step become the respective predetermined values, but the highest temperature of the first carbonizing furnace is preferably in the range of from 550 to 700° C., more preferably 620° C. or higher. The lowest temperature (inlet temperature) of the first carbonizing furnace is preferably in the range of from 300 to 500° C., more preferably in the range of from 300 to 450° C. The residence time in the first carbonizing furnace is not particularly limited, but is preferably one minute or more, more preferably 2 to 20 minutes.

In the invention, in the second carbonizing furnace, the carbonization treatment is performed while applying a tension of 160 to 300 mg/dtex to the fiber. The tension in the second carbonizing furnace is more preferably in the range of from 180 to 250 mg/dtex. When the tension in the second carbonizing furnace is in the above range, the structure of the resultant carbon fiber is controlled to cause the crystal orientation degree of the carbon fiber to be in an appropriate range, so that a carbon fiber having excellent tensile strength can be produced. When the tension in the second carbonizing furnace is too low, the crystal orientation degree is likely to be reduced so that the tensile strength of the carbon fiber is lowered, making it difficult to obtain a carbon fiber which satisfies the formula (2). On the other hand, when the tension in the second carbonizing furnace is too high, it is likely that fiber breakages in the second carbonization step are increased, making it difficult to produce a carbon fiber.

In the invention, with respect to the temperature of the second carbonizing furnace, there is no particular limitation as long as the temperature of the second carbonizing furnace is set so that the temperature gradient and integral quantity of heat throughout the carbonization step become the respective predetermined values, but the lowest temperature (inlet temperature) of the second carbonizing furnace is preferably in the range of from 550 to 700° C., more preferably in the range of from 600 to 650° C. When the lowest temperature of the second carbonizing furnace is in the above range, the crystal structure of the carbon fiber can be easily in an appropriate range, and a carbon fiber having excellent tensile strength can be easily produced. When the lowest temperature is too high, the crystallite size of the resultant carbon fiber is likely to be increased, making it difficult to obtain a carbon fiber which satisfies the formula (1). The lowest temperature of the second carbonizing furnace is preferably a temperature which is the highest temperature of the first carbonizing furnace or higher. Further, the highest temperature of the second carbonizing furnace is preferably in the range of from 1,400 to 1,750° C., more preferably in the range of from 1,500 to 1,700° C. When the highest temperature of the second carbonizing furnace is in the above range, the crystal structure of the carbon fiber can be easily in an appropriate range, and a carbon fiber having excellent balance between the tensile strength and the tensile modulus can be easily produced. When the highest temperature of the second carbonizing furnace is too high, it is likely that the crystal structure of the carbon fiber develops, so that the crystallite size is increased, making it difficult to obtain a carbon fiber which satisfies the formula (1). On the other hand, when the highest temperature is too low, it is likely that crystals of the carbon fiber do not satisfactorily develop, making it difficult to obtain a carbon fiber which satisfies the formula (2). The residence time in the second carbonizing furnace is not particularly limited, but is preferably 2 minutes or more, more preferably 2.5 to 10 minutes.

In the invention, the temperature gradient throughout the carbonization step including both the carbonization treatment conducted in the first carbonizing furnace and the carbonization treatment conducted in the second carbonizing furnace is 300 to 600° C./min, preferably 300 to 450° C./min. The temperature gradient throughout the carbonization step is in the above range, and therefore the crystal structure of the resultant carbon fiber can be appropriately controlled, making it possible to obtain a carbon fiber having excellent balance between the tensile strength and the crystallite size. When the temperature gradient throughout the carbonization step is too small, graphite crystals of the carbon fiber are unlikely to develop, so that the crystallite size is reduced, making it difficult to obtain a carbon fiber which satisfies the formula (2). On the other hand, when the temperature gradient throughout the carbonization step is too large, it is likely that fiber breakages in the carbonization step are increased, making it difficult to produce a carbon fiber, or the tensile strength of the resultant carbon fiber is likely to be lowered, making it difficult to obtain a carbon fiber which satisfies the formula (2).

In the invention, the temperature gradient throughout the carbonization step indicates an average temperature gradient at temperatures from the lowest temperature (inlet temperature) of the first carbonizing furnace through the highest temperature of the second carbonizing furnace, and is determined by dividing a temperature difference between the highest temperature of the second carbonizing furnace and the lowest temperature of the first carbonizing furnace by a substantial residence time in the carbonizing furnace until the highest temperature of the second carbonizing furnace has been reached. The substantial residence time in the carbonizing furnace is a period of time during which the treated fiber (oxidized fiber) is heated in the carbonizing furnace, and does not include a time during which the treated fiber is outside the carbonizing furnace, such as a time for transferring the fiber from the first carbonizing furnace to the second carbonizing furnace.

Further, in the invention, the integral quantity of heat given to the oxidized fiber throughout the carbonization step including both the carbonization treatment conducted in the first carbonizing furnace and the carbonization treatment conducted in the second carbonizing furnace is 80 to 105 J·h/g. The integral quantity of heat throughout the carbonization step is preferably 90 to 105 J·h/g, more preferably 100 to 105 J·h/g. The integral quantity of heat throughout the carbonization step is in the above range, and therefore the crystal structure of the resultant carbon fiber can be appropriately controlled, making it possible to obtain a carbon fiber having excellent balance between the crystallite size, the tensile strength, and the tensile modulus. When the integral quantity of heat throughout the carbonization step is too small, graphite crystals of the carbon fiber are unlikely to develop, so that the crystallite size is reduced, making it difficult to obtain a carbon fiber which satisfies the formula (1) and the formula (2). On the other hand, when the integral quantity of heat throughout the carbonization step is too large, the crystallite size of the resultant carbon fiber is likely to be too large, making it difficult to obtain a carbon fiber which satisfies the formula (1).

The integral quantity of heat given to the oxidized fiber can be more accurately determined by actually measuring a temperature of the oxidized fiber being subjected to heat treatment (treated fiber), but the measurement of a temperature of the traveling treated fiber is technically difficult. For this reason, in the invention, the temperature of the treated fiber in the carbonizing furnace is presumed to be the same as the carbonizing furnace temperature, and the quantity of heat and integral quantity of heat given to the treated fiber are values determined from the formulae below using a carbonizing furnace temperature T [K], a residence time t [h] in the carbonizing furnace, and a specific heat capacity Cp [J/g·K] of the oxidized fiber. The specific heat capacity of the oxidized fiber can be measured, for example, in accordance with JIS K7123 using a differential scanning calorimeter (DSC).

Quantity of heat [J/g] given to the fiber precursor by the heated gas=$T \times Cp$ Integral quantity of heat [J·h/g] given to the fiber precursor=$T \times t \times Cp$ T: Temperature [K] of the heated gas
t: Residence time [h] in the furnace
Cp: Specific heat capacity [J/g·K] of the oxidized fiber By using the above-mentioned method for producing a carbon fiber of the invention, the carbon fiber of the invention having excellent strength development rate when used in a composite material can be produced. The carbon fiber obtained by the method for producing a carbon fiber of the invention exhibits excellent strength development rate when used in a composite material. Therefore, by using the carbon fiber of the invention as a reinforcing fiber for fiber-reinforced composite material, a fiber-reinforced composite material having excellent mechanical properties can be obtained.

More specifically, the carbon fiber of the invention can be produced by, for example, the method described below.

<Precursor Fiber>

The precursor fiber used in the method for producing a carbon fiber is preferably an acrylic precursor fiber produced by spinning a spinning solution obtained by homopolymerizing or copolymerizing a monomer or monomers containing 90% by mass or more, preferably 95% by mass or more of acrylonitrile and 10% by mass or less of other monomers. Examples of other monomers include itaconic acid and (meth)acrylates. The raw material fiber obtained after the spinning is subjected to washing with water, drying, stretching, and oiling treatment to obtain a precursor fiber. In this case, it is preferred that the fiber is subjected to steam stretching so that the total stretch ratio becomes 5 to 15 times.

The precursor fiber used in the invention is preferably a precursor fiber having a filament diameter of 14 µm or less, more preferably 13 µm or less. The lower limit of the filament diameter is not particularly limited, but is preferably 8 µm or more, more preferably 10 µm or more, especially preferably 11 µm or more. The number of filaments in the precursor fiber bundle is preferably 1,000 to 100,000, more preferably 5,000 to 50,000. The fineness of the precursor fiber bundle is preferably 1,000 to 10,000 tex.

<Flame Resistance Imparting Treatment>

The obtained precursor fiber is preferably subjected to preheat treatment (preliminary oxidization treatment) at 200 to 260° C. and at a stretch ratio of 0.80 to 1.20 before subjected to oxidization treatment. The precursor fiber which has been subjected to preliminary oxidization treatment is subsequently subjected to oxidization treatment in the heated air at 200 to 260° C. The oxidization treatment is generally made at a stretch ratio ranging from 0.85 to 1.15, but, for obtaining a carbon fiber having high strength and high modulus, the stretch ratio is more preferably 0.90 or more. The oxidization treatment is preferably conducted until the precursor fiber has become an oxidized fiber having a fiber density of 1.34 to 1.38 g/cm$^3$.

<First Carbonization Treatment>

The above-mentioned oxidized fiber can be carbonized by employing a conventionally known method. For example, first carbonization that is the first stage is preferably conducted in which the temperature is gradually increased in a nitrogen atmosphere at 300 to 800° C. in a first carbonizing furnace while controlling the tension of the oxidized fiber.

In the invention, the highest temperature of the first carbonizing furnace is preferably 550 to 700° C., more preferably 620° C. or higher. Further, the lowest temperature (inlet temperature) of the first carbonizing furnace is preferably in the range of from 300 to 500° C., more preferably in the range of from 300 to 450° C. The residence time in the first carbonizing furnace is not particularly limited, but is preferably one minute or more, more preferably 2 to 20 minutes.

<Second Carbonization Treatment>

For further advancing the carbonization and graphitization (obtaining highly crystallized carbon), calcination is preferably conducted in which the temperature is gradually increased in an inert gas atmosphere of nitrogen or the like at 500 to 1,800° C. in a second carbonizing furnace while controlling the tension.

In each carbonizing furnace, the temperature is preferably gradually changed from the temperature near the inlet of the furnace because it is easy to suppress formation of a surface defect or an internal defect in the fiber. The first carbonization treatment to the second carbonization treatment may be performed while controlling the tension and, if necessary, using a plurality of furnaces so that the predetermined physical properties are achieved.

In the invention, the inlet temperature of the second carbonizing furnace is preferably 550 to 700° C., more preferably 600 to 650° C. Further, the highest temperature of the second carbonizing furnace is preferably 1,400 to 1,750° C., more preferably 1,500 to 1,700° C. The residence time in the second carbonizing furnace is preferably 2.5 minutes or more, more preferably 2.5 to 10 minutes.

In the invention, in the second carbonizing furnace, the carbonization treatment is conducted while applying a tension of 160 to 300 mg/dtex to the fiber. The tension in the second carbonizing furnace is more preferably in the range of from 180 to 250 mg/dtex.

In the invention, the temperature gradient throughout the carbonization step including both the carbonization treatment conducted in the first carbonizing furnace and the carbonization treatment conducted in the second carbonizing furnace is 300 to 600° C./min, preferably 300 to 450° C./min. Further, the integral quantity of heat given to the oxidized fiber throughout the carbonization step including both the carbonization treatment conducted in the first carbonizing furnace and the carbonization treatment conducted in the second carbonizing furnace is 80 to 105 J·h/g, preferably 90 to 105 J·h/g, more preferably 100 to 105 J·h/g.

<Surface Oxidation Treatment>

The carbon fiber bundle is subjected to surface oxidation treatment in an electrolytic solution preferably at a treatment electrical quantity of 10 to 250 C/g, more preferably 20 to 200 C/g. When the treatment electrical quantity is larger, the surface oxygen concentration ratio 0/C of the carbon fiber is larger, and hence the adhesion between the carbon fiber and the matrix resin tends to be improved, but, when the treatment electrical quantity is too large, a defect is likely to be caused in the surface of the carbon fiber. As the electrolytic solution, an aqueous solution of an inorganic acid, such as nitric acid or sulfuric acid, or an inorganic acid salt, such as ammonium sulfate, can be used, but, from the viewpoint of the safety and handling properties, an aqueous solution of ammonium sulfate is more preferred. The temperature of the electrolytic solution is preferably 20 to 50° C. The concentration of the electrolytic solution is preferably 0.5 to 2.0 N, more preferably 0.7 to 1.5 N.

<Sizing Treatment>

The surface-treated carbon fiber bundle is passed through a sizing liquid to apply a sizing agent to the carbon fiber bundle. The concentration of the sizing agent in the sizing liquid is preferably 10 to 25% by mass, and the amount of the applied sizing agent is preferably 0.4 to 1.7% by mass. With respect to the sizing agent applied to the carbon fiber bundle, there is no particular limitation, and examples of sizing agents include an epoxy resin, a urethane resin, a polyester resin, a vinyl ester resin, a polyamide resin, a polyether resin, an acrylic resin, a polyolefin resin, a polyimide resin, and modification products thereof. A suitable sizing agent can be appropriately selected according to the matrix resin used for a composite material. Two or more sizing agents can be used in combination. In the sizing agent application treatment, generally, an emulsion method is used in which the carbon fiber bundle is immersed in an aqueous emulsion obtained using an emulsifying agent and the like. Further, for improving the carbon fiber in handling properties, fretting resistance, fluffing resistance, or impregnation properties, an auxiliary component, such as a dispersant or a surfactant, may be added to the sizing agent.

<Drying Treatment>

The carbon fiber bundle which has been subjected to sizing treatment is subjected to drying treatment for evaporating water or the like which is the dispersing medium used in the sizing treatment, obtaining a carbon fiber bundle for producing a composite material. In the drying, an air dryer is preferably used. With respect to the drying temperature, there is no particular limitation, but, in the case of a general-purpose aqueous emulsion, the drying temperature is generally set at 100 to 180° C. Further, in the invention, after the drying step, the carbon fiber bundle can be subjected to heat treatment step at 200° C. or higher.

Thus, the carbon fiber of the invention can be obtained. The carbon fiber obtained by the above-mentioned method for producing a carbon fiber of the invention exhibits excellent strength development rate when used in a composite material. Therefore, by using the carbon fiber as a reinforcing fiber for fiber-reinforced composite material, a fiber-reinforced composite material having excellent mechanical properties can be obtained.

A prepreg which is another embodiment of the invention is obtained by impregnating the above-mentioned carbon fiber of the invention with a matrix resin. Further, a fiber-reinforced composite material which is still another embodiment of the invention is obtained by using the above-mentioned carbon fiber of the invention and a matrix resin in combination, for example, by a known means or method, such as autoclave molding, press molding, resin transfer molding, filament winding molding, or injection molding.

When used in the prepreg or fiber-reinforced composite material, the carbon fibers may be used in the form of a fiber bundle, and can be used in the form of a sheet-form reinforcing fiber material formed by processing a plurality of the fiber bundles into a sheet form. Examples of sheet-form materials include one which is obtained by unidirectionally orienting the fiber into a sheet form, one which is obtained by forming the fiber material into cloth, such as woven or knitted fabric or nonwoven fabric, and multiaxial woven fabric. The fiber may be used in the form of either a continuous fiber or a discontinuous fiber. Further, there may be used a laminated substrate obtained by laminating a plurality of carbon fiber sheets oriented into a sheet form so that the fiber orientation is in the same direction or so that the angle for orientation is changed to cause the fiber orientation to be in different directions. When using a laminated substrate, the laminated sheets may be bonded together using a binder resin, a stitch yarn or the like. Further, resin particles or an interleaf material, such as nonwoven fabric, may be disposed between the laminated sheets.

When the carbon fiber of the invention is used as a sheet-form reinforcing fiber material, the fiber areal weight of the reinforcing fiber material is preferably 25 to 10,000 $g/m^2$.

As the matrix resin, a thermosetting resin or a thermoplastic resin is used. Specific examples of thermosetting matrix resins include an epoxy resin, an unsaturated polyester resin, a phenolic resin, a vinyl ester resin, a cyanate resin, a urethane acrylate resin, a phenoxy resin, an alkyd resin, a urethane resin, a pre-reacted resin of a maleimide resin and a cyanate resin, a bismaleimide resin, a polyimide resin and polyisoimide resin having an acetylene end, and a polyimide resin having a nadic acid end. These can be used individually or in combination. Of these, an epoxy resin and a vinyl ester resin having excellent heat resistance, modulus, and chemical resistance are especially preferred. The above thermosetting resin may contain a curing agent and a curing accelerator, and further a coloring agent or various additives generally used and the like.

Examples of thermoplastic resins include polypropylene, polysulfone, polyether sulfone, polyether ketone, polyether ether ketone, polyamide, aromatic polyester, aromatic polycarbonate, polyether imide, polyarylene oxide, thermoplastic polyimide, polyamide-imide, polyacetal, polyphenylene oxide, polyphenylene sulfide, polyarylate, polyacrylonitrile, polybenzimidazole, and polystyrene. These resins may be used individually or in combination.

The content of the carbon fiber in the prepreg or fiber-reinforced composite material is preferably in the range of from 10 to 90% by volume, more preferably in the range of from 15 to 60% by volume.

When the carbon fiber of the invention is unified with a resin to form an intermediate material having a fiber substrate impregnated with the resin, such as a prepreg, or a fiber-reinforced composite material, as mentioned above, there is no particular limitation with respect to the form of the fiber substrate, the type of the resin used, the molding method, and the like. However, in the case of using the carbon fiber of the invention, even when a form of the fiber substrate obtained by unidirectionally orienting the fiber, which the fiber substrate is relatively unlikely to be impregnated with a resin, or a resin having a high viscosity is used, or even when a molding method in which molding is conducted under a relatively low pressure, such as press molding, resin transfer molding, or filament winding molding, is used, the fiber substrate is easily impregnated with a resin, and therefore a composite material having high strength development rate and excellent mechanical properties can be obtained. Accordingly, the carbon fiber of the invention exhibits especially excellent effects when the carbon fiber is unified with a resin under the above conditions to form an intermediate material having a fiber substrate impregnated with the resin, such as a prepreg, or a fiber-reinforced composite material.

When the carbon fiber of the invention is used in the prepreg or fiber-reinforced composite material, the carbon fiber is preferably used in the form of oriented fiber, that is, a fiber bundle, a sheet-form substrate obtained by unidirectionally orienting the fiber, woven or knitted fabric, multiaxial woven fabric, a laminated substrate formed by laminating a plurality of carbon fiber sheets obtained by orienting the fiber into a sheet form, or the like because excellent effects of the carbon fiber of the invention are likely to be obtained. Particularly, the carbon fiber is preferably used in the form of a sheet-form substrate obtained by unidirectionally orienting the fiber, or a laminated substrate formed by laminating a plurality of carbon fiber sheets obtained by orienting the fiber into a sheet form.

The matrix resin used in combination with the carbon fiber of the invention preferably has a resin viscosity at the impregnation temperature of 0.1 to 50 Pa·sec, more preferably 1 to 30 Pa·sec. The carbon fiber of the invention exhibits especially excellent effects when the resin viscosity is more than 10 Pa·sec at the impregnation temperature.

When the carbon fiber of the invention is unified with a resin to produce a fiber-reinforced composite material, the fiber-reinforced composite material may be produced through the prepreg of the invention which is obtained by impregnating a fiber substrate formed from the carbon fiber of the invention with a resin, or may be produced by directly impregnating the carbon fiber of the invention with a resin in the molding step without forming the prepreg.

The prepreg of the invention obtained by impregnating a fiber substrate formed from the carbon fiber of the invention with a resin is described below in more detail.

The prepreg of the invention comprises a fiber substrate formed from the carbon fiber of the invention, and a matrix resin composition with which the carbon fiber is impregnated.

The prepreg of the invention is a prepreg having part of or all of a fiber substrate impregnated with a matrix resin composition. The content of the matrix resin composition in the prepreg is preferably 15 to 60% by mass, based on the mass of the prepreg. When the resin content of the prepreg is too small, voids and the like are likely to be caused in the obtained fiber-reinforced composite material, so that the mechanical physical properties become poor. When the resin content of the prepreg is too large, the reinforcing effect of the reinforcing fiber is likely to be unsatisfactory, so that the mechanical physical properties relative to the mass substantially become poor. The resin content of the prepreg is preferably 20 to 55% by mass, more preferably 25 to 50% by mass.

With respect to the fiber substrate used in the prepreg of the invention, the carbon fiber is preferably used in the form of a continuous fiber bundle or a carbon fiber sheet obtained by forming the fiber into a sheet form. Examples of carbon fiber sheets include a sheet obtained by unidirectionally orienting a number of carbon fibers, bidirectional woven fabric, such as plain weave or twill weave fabric, multiaxial woven fabric, nonwoven fabric, mat, knit, braid, and paper made from a carbon fiber. Of these, the carbon fiber is preferably used in the form of a continuous fiber bundle, or a unidirectionally oriented sheet, bidirectional woven fabric, or a multiaxial woven fabric substrate, each obtained by forming the carbon fiber as a continuous fiber into a sheet form, because a fiber-reinforced composite material having more excellent mechanical physical properties can be obtained. The thickness of the fiber substrate is preferably 0.01 to 3 mm, more preferably 0.1 to 1.5 mm.

As the matrix resin, the above-mentioned thermosetting resin or thermoplastic resin can be used. From the viewpoint of the heat resistance, the thermosetting resin is preferably used. Especially, from the viewpoint of the mechanical properties, an epoxy resin, a vinyl ester resin, or a bismaleimide resin is preferably used, and an epoxy resin is especially preferably used. The above thermosetting resin may contain a curing agent and a curing accelerator, and further a coloring agent or various additives generally used and the like.

When an epoxy resin is used as the matrix resin, a conventionally known epoxy resin can be used. Especially, an epoxy resin having an aromatic group is preferred, and an epoxy resin having any of a glycidylamine structure and a glycidyl ether structure is preferred. Further, an alicyclic epoxy resin can be preferably used.

Examples of epoxy resins having a glycidylamine structure include tetrafunctional epoxy resins, such as various isomers of tetraglycidyldiaminodiphenylmethane or tetraglycidyldiaminodiphenyl ether, and trifunctional epoxy resins, such as various isomers of N,N,O-triglycidyl-p-aminophenol, N,N,O-triglycidyl-m-aminophenol, N,N,O-triglycidyl-3-methyl-4-aminophenol, or triglycidylaminocresol.

Examples of epoxy resins having a glycidyl ether structure include a bisphenol A epoxy resin, a bisphenol F epoxy resin, a bisphenol S epoxy resin, a phenolic novolak epoxy resin, and a cresol novolak epoxy resin.

These epoxy resins, if necessary, may have a nonreactive substituent in the aromatic cyclic structure or the like. Examples of nonreactive substituents include alkyl groups, such as methyl, ethyl, and isopropyl, aromatic groups, such as phenyl, alkoxy groups, aralkyl groups, and halogen groups, such as chlorine and bromine.

Of these epoxy resins, from the viewpoint of the mechanical properties of the obtained composite material, a trifunctional or multifunctional epoxy resin is preferably used in an amount of 50 wt % or more, based on the total weight of the epoxy resins used. As the multifunctional epoxy resin, tetrafunctional epoxy resins are more preferably used, and tetrafunctional epoxy resins having a glycidylamine structure, such as various isomers of tetraglycidyldiaminodiphenylmethane or tetraglycidyldiaminodiphenyl ether, are further preferably used, and tetraglycidyl-3,4'-diaminodiphenyl ether is especially preferably used. When tetraglycidyl-3,4'-diaminodiphenyl ether is used as a multifunctional epoxy resin, the tetraglycidyl-3,4'-diaminodiphenyl ether is preferably used in an amount of 50 wt % or more, based on the total weight of the trifunctional or multifunctional epoxy resins.

When a trifunctional or multifunctional epoxy resin is used, the mass ratio of the trifunctional or multifunctional epoxy resin and the difunctional or monofunctional epoxy resin is preferably 5:5 to 9:1, more preferably 6:4 to 8:2. When the epoxy resins are blended in the above ratio, a composite material having a high crosslinking density and excellent mechanical properties can be obtained.

When an epoxy resin is used as the matrix resin, if necessary, a curing agent is added to the epoxy resin. Examples of curing agents used in the epoxy resin include dicyandiamide, various isomers of aromatic amine curing agents, and imidazole compounds. From the viewpoint of the curing properties and excellent physical properties of the cured resin, preferred are dicyandiamide (DICY) which is an amide curing agent, and imidazole compounds. For obtaining a higher heat resistance, an aromatic amine curing agent is preferably used. With respect to the aromatic amine curing agent, diaminodiphenyl sulfone (DDS) and diaminodiphenylmethane (DDM) can be used individually or in combination, but a derivative of DDS is preferred in view of imparting a heat resistance.

Specific examples of diaminodiphenyl sulfones (DDS) include 4,4'-DDS, manufactured by Wakayama Seika Kogyo Co., Ltd., and 4,4'-DDS and 3,3'-DDS, manufactured by Tokyo Chemical Industry Co., Ltd.

Specific examples of dicyandiamide (DICY) include jER CURE DICY7, DICY15, manufactured by Mitsubishi Chemical Corporation. When using DICY, it is more preferred that DICY and an urea curing agent are used in combination. The solubility of DICY in an epoxy resin is not very high, and therefore, for satisfactorily dissolving DICY in the resin, it is necessary to heat the resin to a temperature as high as 160° C. or more, but, by using an urea curing agent in combination with DICY, the dissolving temperature can be reduced.

Examples of urea curing agents include phenyldimethylurea (PDMU), toluenebisdimethylurea (TBDMU), and dichlorophenyldimethylurea (DCMU).

Examples of imidazole compounds include imidazole compounds obtained by replacing the hydrogen of 1H-imidazole at the 5-position by a hydroxymethyl group and replacing the hydrogen of the 1H-imidazole at the 2-position by a phenyl group or a tolyl group, such as 2-phenyl-4,5-dihydroxymethylimidazole, 2-phenyl-4-methyl-5-hydroxymethylimidazole, 2-phenyl-4-benzyl-5-hydroxymethylimidazole, 2-paratolyl-4-methyl-5-hydroxymethylimidazole, 2-metatolyl-4-methyl-5-hydroxymethylimidazole, 2-metatolyl-4,5-dihydroxymethylimidazole, and 2-paratolyl-4,5-dihydroxymethylimidazole. Of these, more preferred are 2-phenyl-4,5-dihydroxymethylimidazole, 2-phenyl-4-methyl-5-hydroxymethylimidazole, 2-paratolyl-4-methyl-5-hydroxymethylimidazole, 2-metatolyl-4-methyl-5-hydroxymethylimidazole, 2-metatolyl-4,5-dihydroxymethylimidazole, and 2-paratolyl-4,5-dihydroxymethylimidazole.

Further examples include 1-(2-hydroxy-3-phenoxypropyl)-2-methylimidazole, and adduct compounds obtained by reacting a glycidyl ether thermosetting resin and 2-methylimidazole. Of these, adduct compounds obtained by reacting an aryl glycidyl ether thermosetting resin and 2-methylimidazole are preferred because a cured product of the thermosetting resin composition having excellent physical properties can be obtained.

The amount of the curing agent used in the thermosetting resin composition is appropriately selected taking into consideration the use or no use of and the amount of the curing agent and curing accelerator, the stoichiometry with an epoxy resin, the curing rate of the composition, and the like. When an aromatic amine curing agent is used as the curing agent, relative to 100 parts by mass of the epoxy resin contained in the prepreg, the curing agent is incorporated in an amount of preferably 30 to 100 parts by mass, more preferably 30 to 70 parts by mass. When DICY and an urea curing agent (such as PDMU, TBDMU, or DCMU) are used in combination as the curing agent, it is preferred that, relative to 100 parts by mass of the epoxy resin, the amount of the DICY used is 1 to 15 parts by mass and the amount of the urea curing agent used is 1 to 10 parts by mass (with the proviso that the total amount of the DICY and the urea curing agent is 2 to 20 parts by mass). When an imidazole compound is used as the curing agent, the amount of the imidazole compound is preferably 2 to 30 parts by mass, more preferably 3 to 15 parts by mass, relative to 100 parts by mass of the thermosetting resin.

When a thermosetting resin is used as the matrix resin, the thermosetting resin composition may contain a thermoplastic resin. The thermoplastic resin has effects such that the resin improves the impact resistance of the resultant composite material and gives an appropriate viscosity to the resin composition. When an epoxy resin is used as the matrix resin, as examples of the thermoplastic resins, there can be mentioned epoxy resin-soluble thermoplastic resins, such as polyether sulfone, polysulfone, polyether imide, and polycarbonate. These may be used individually or in combination. Especially preferred are polyether sulfone and polysulfone each having a weight average molecular weight ($M_w$) in the range of from 8,000 to 40,000, as measured by GPC (gel permeation chromatography).

The amount of the thermoplastic resin contained in the resin composition varies depending on the type of the thermosetting resin used, and may be appropriately controlled so that the viscosity of the resin composition becomes an appropriate value. When an epoxy resin is used as the matrix resin, the amount of the epoxy resin-soluble thermoplastic resin contained is preferably 5 to 90 parts by mass, more preferably 10 to 50 parts by mass, further preferably 15 to 40 parts by mass, especially preferably 20 parts by mass or more, relative to 100 parts by mass of the epoxy resin. The higher the amount of the epoxy resin-soluble thermoplastic resin contained, the more easily a composite material having excellent impact resistance can be obtained, but, when the amount of the epoxy resin-soluble thermoplastic resin contained is too high, the viscosity of the resin composition is likely to be markedly increased, so that the handling properties of the prepreg become extremely poor.

With respect to the form of the soluble thermoplastic resin, there is no particular limitation, but the soluble thermoplastic resin is preferably in a particle form. The soluble thermoplastic resin in a particle form can be uniformly incorporated into the resin composition. Further, the obtained prepreg has high moldability. The soluble thermoplastic resin preferably has an average particle diameter of 1 to 50 μm, especially preferably 3 to 30 μm. When the particle diameter of the soluble thermoplastic resin is too small, the viscosity of the resin composition is likely to be markedly increased, making it difficult to add a satisfactory amount of the soluble thermoplastic resin to the resin composition. When the particle diameter of the soluble thermoplastic resin is too large, it is likely that a sheet having a uniform thickness cannot be obtained upon processing the resin composition into a sheet form. Further, the dissolving rate in the resin is likely to be reduced, so that the obtained fiber-reinforced composite material is not uniform.

Further, as the thermoplastic resin, an insoluble thermoplastic resin which is insoluble in the matrix resin can be used. When an epoxy resin is used as the matrix resin, examples of epoxy resin-insoluble thermoplastic resins include polyamide, polyacetal, polyphenylene oxide, polyphenylene sulfide, polyester, polyamide-imide, polyimide, polyether ketone, polyether ether ketone, polyethylene naphthalate, polyether nitrile, and polybenzimidazole. Of these, polyamide, polyamide-imide, and polyimide are preferred because they have high toughness and high heat resistance. Polyamide and polyimide are especially excellent in the toughness improving effect.

Particularly, by using amorphous polyimide, or polyamide, such as nylon 6 (registered trademark) (polyamide obtained by a ring-opening polycondensation reaction of caprolactam), nylon 12 (polyamide obtained by a ring-opening polycondensation reaction of lauryllactam), nylon 1010 (polyamide obtained by a copolymerization reaction of sebacic acid and 1,10-decanediamine), or amorphous nylon (nylon which is also called transparent nylon, and which suffers no crystallization of the polymer or has an extremely low crystallization rate of the polymer), it is possible to particularly improve the heat resistance of the obtained fiber-reinforced composite material. These may be used individually or in combination. Further, a copolymer of these can be used.

From the viewpoint of the heat resistance, the insoluble thermoplastic resin preferably has a melting point of 150° C. or higher, more preferably 170° C. or higher, further preferably 180° C. or higher.

In the invention, with respect to the form of the insoluble thermoplastic resin, there is no particular limitation, but the insoluble thermoplastic resin is preferably in a particle form, and preferably has a sphericity of 80% or more. The thermoplastic resin particles having a spherical shape can be uniformly incorporated into the resin composition. Further, the obtained prepreg has high moldability. The resin particles preferably have an average particle diameter of 1 to 50 μm, especially preferably 3 to 30 μm. When the particle diameter of the resin particles is too small, the viscosity of the resin composition is likely to be markedly increased, making it difficult to add a satisfactory amount of the resin particles to the resin composition. When the particle diameter of the resin particles is too large, it is likely that a sheet having a uniform thickness cannot be obtained upon processing the epoxy resin composition into a sheet form.

The resin particles to be added to the resin composition are preferably subjected to heat treatment if necessary. The heat treatment can make the resin particles homogeneous. By using the resin particles which have been subjected to heat treatment, a fiber-reinforced composite material having excellent interlaminar toughness can be obtained. The heat treatment is preferably conducted in a fluid, such as a liquid or a gas, more preferably conducted in a gas. When conducting the heat treatment in a fluid, the whole of the surface of the resin particles can be evenly subjected to heat treatment.

When the heat treatment is conducted in a gas, there is no particular limitation with respect to the gas used, and, for example, an oxidizing gas, such as air, oxygen, ozone, or nitrogen dioxide, a reducing gas, such as carbon monoxide or nitrogen monoxide, or an inert gas, such as nitrogen, helium, or argon, can be used. The heat treatment temperature can be appropriately selected according to the thermoplastic resin particles used, and is preferably a temperature which is the melting point of the resin particles used or higher, more preferably 100 to 800° C., further preferably 250 to 600° C.

With respect to the method for heating treatment, the resin particles are preferably sprayed and dispersed into a fluid heated to the treatment temperature. By spraying and dispersing the resin particles into a fluid, the whole of the resin particles can be uniformly subjected to heat treatment. When the resin is sprayed and dispersed into a fluid, the flow rate of the fluid (gas flow rate when the fluid is a gas) is preferably 0.1 to 10 m$^3$/min, more preferably 0.5 to 5 m$^3$/min. The feed rate of the resin sprayed and dispersed is preferably 1 to 100 g/min per 1 m$^3$ of the heated fluid.

When an epoxy resin is used as the matrix resin, the amount of the insoluble thermoplastic resin contained is preferably 5 to 60 parts by mass, more preferably 15 to 50 parts by mass, especially preferably 20 to 40 parts by mass, relative to 100 parts by mass of the epoxy resin. The higher the amount of the insoluble thermoplastic resin contained, the more easily a composite material having excellent impact resistance can be obtained, but, when the amount of the insoluble thermoplastic resin contained is too high, it is likely that the impregnation properties into the reinforcing fiber layer, the draping properties of the obtained prepreg, and the like become poor. The carbon fiber of the invention is advantageous in that a fiber substrate formed from the carbon fiber of the invention is easily impregnated with even a resin having such a high viscosity that a fiber substrate is relatively unlikely to be impregnated with the resin. Therefore, by using the carbon fiber of the invention as a fiber substrate, a resin composition containing a thermoplastic resin in a relatively large amount can be used as a matrix resin, making it possible to obtain a composite material having excellent mechanical properties.

In the invention, the soluble thermoplastic resin indicates a thermoplastic resin, part of or all of which can be dissolved in a thermosetting resin at a temperature at which a fiber-reinforced composite material is formed, or lower. When an epoxy resin is used as the matrix resin, the phenomenon in which part of the thermoplastic resin is dissolved in the epoxy resin means that when 10 parts by mass of the thermoplastic resin having an average particle diameter of 10 to 50 μm is mixed into 100 parts by mass of the epoxy resin and the resultant mixture is stirred at 190° C. for one hour, the resin does not have a particle form any longer or the size of the resin particles is changed by 10% or more. Meanwhile, the insoluble resin indicates a resin which is not substantially dissolved in a thermosetting resin at a temperature at which a fiber-reinforced composite material is formed, or lower. Specifically, when an epoxy resin is used as the matrix resin, the insoluble resin indicates resin particles such that when 10 parts by mass of the resin particles having an average particle diameter of 20 to 50 μm are mixed into 100 parts by mass of the epoxy resin and the resultant mixture is stirred at 190° C. for one hour, the size of the resin particles is not changed by 10% or more. When an epoxy resin is used as the matrix resin, the temperature at which a fiber-reinforced composite material is formed is generally 100 to 190° C. Further, the particle diameter is visually measured using a microscope, and the average particle diameter means an average of the particle diameter values of 100 particles randomly selected.

The soluble thermoplastic resin and the insoluble thermoplastic resin may be individually used, but the soluble thermoplastic resin and the insoluble thermoplastic resin are preferably used in combination. When an epoxy resin is used as the matrix resin, the amount of the thermoplastic resin contained, which is the sum of the soluble thermoplastic resin and the insoluble thermoplastic resin, is preferably 10 to 150 parts by mass, more preferably 20 to 100 parts by mass, further preferably 30 to 80 parts by mass, especially preferably 40 parts by mass or more, relative to 100 parts by mass of the epoxy resin. The higher the amount of the thermoplastic resin contained, the more easily a composite material having excellent impact resistance can be obtained, but, when the amount of the thermoplastic resin contained is too high, it is likely that the impregnation properties into the reinforcing fiber layer, the draping properties of the obtained prepreg, and the like become poor. The carbon fiber of the invention is advantageous in that a fiber substrate formed from the carbon fiber of the invention is easily impregnated with even a resin having such a high viscosity that a fiber substrate is relatively unlikely to be impregnated with the resin. Therefore, by using the carbon fiber of the invention as a fiber substrate, a resin composition containing a thermoplastic resin in a relatively large amount can be used as a matrix resin, making it possible to obtain a composite material having excellent mechanical properties.

In the invention, the thermosetting resin composition may contain thickening particles. The thickening particles dispersed in the thermosetting resin swell within the thermosetting resin due to heating, and therefore maintains an appropriate viscosity of the resin composition being heat-cured, making it possible to suppress flowing of the resin during the molding.

When an epoxy resin is used as the matrix resin, examples of thickening particles include particles obtained by copolymerizing a single or a plurality of unsaturated compounds and a crosslinking monomer. There is no particular limitation, but the thickening particles desirably comprise a resin having as a monomer unit at least one member of an acrylate compound, a methacrylate compound, and a vinyl compound.

The acrylate compound used in the thickening particles indicates a compound having an acrylate structure and a derivative thereof, and examples of acrylate compounds include methyl acrylate, ethyl acrylate, n-propyl acrylate, isopropyl acrylate, n-butyl acrylate, isobutyl acrylate, sec-butyl acrylate, t-butyl acrylate, n-hexyl acrylate, and cyclohexyl acrylate.

The methacrylate compound used in the thickening particles indicates a compound having a methacrylate structure and a derivative thereof, and examples of methacrylate compounds include methyl methacrylate, ethyl methacrylate, n-propyl methacrylate, isopropyl methacrylate, n-butyl methacrylate, n-hexyl methacrylate, and cyclohexyl methacrylate.

The vinyl compound used in the thickening particles indicates a compound having a polymerizable vinyl structure, and examples of vinyl compounds include styrene, α-methylstyrene, divinylbenzene, and these compounds having an aromatic ring substituted with various functional groups, such as an alkyl group or a halogen atom.

The thickening particles may be a polymer comprising one type or two or more types of polymerization units selected from the group consisting of a methacrylate compound, an acrylate compound, and a vinyl compound, or may be a resin having mixed two or more resins having different structures. Alternatively, the thickening particles may be a composite resin obtained by adding (iii) metal ions to (i) a polymer comprising at least one member of an acrylate compound or a methacrylate compound and a diene compound and (ii) a polymer comprising an acrylate compound or a methacrylate compound and a radically polymerizable unsaturated carboxylic acid to cause ionic cross-linking.

The thickening particles are preferably a polymer comprising one type or two or more types of polymerization units selected from the group consisting of a methacrylate compound, an acrylate compound, and a vinyl compound, more preferably an alkyl methacrylate polymer.

The thickening particles preferably have an average polymerization degree of 4,000 to 40,000. With respect to the thickening particles, commercially available products of an alkyl methacrylate polymer having no core/shell structure, such as ZEFIAC F325 and ZEFIAC F320 (each of which is manufactured by Aica Kogyo Co., Ltd.), are preferably used. An alkyl methacrylate polymer having a core/shell structure is unlikely to swell in the thermosetting resin composition due to the shell structure and thus has a poor effect of increasing the viscosity, and therefore is not preferred.

With respect to the particle diameter and the like of the thickening particles, there is no particular limitation, but the average particle diameter of the thickening particles is preferably 0.3 to 10 μm, more preferably 0.5 to 8 μm. The amount of the thickening particles contained is preferably 2 to 20 parts by mass, more preferably 3 to 18 parts by mass, especially preferably 4 to 15 parts by mass, relative to 100 parts by mass of the epoxy resin.

In the thermosetting resin composition, a conductive additive, a flame retardant, an inorganic filler, or an internal release agent may be incorporated. Examples of conductive additives include conductive polymer particles, such as polyacetylene particles, polyaniline particles, polypyrrole particles, polythiophene particles, polyisothianaphthene particles, and polyethylene dioxythiophene particles, carbon particles, carbon fiber particles, metal particles, and additives having a core material which is formed from an inorganic material or an organic material, and which is coated with a conductive material. The shape of the conductive additive may be a spherical shape, a filler shape, or a combination thereof.

Examples of flame retardants include phosphorus flame retardants. With respect to the phosphorus flame retardant, there is no particular limitation as long as it contains a phosphorus atom in the molecule thereof, and examples include organophosphorus compounds, such as a phosphate, a condensed phosphate, a phosphazene compound, and a polyphosphate, and red phosphorus.

Examples of inorganic fillers include aluminum borate, calcium carbonate, silicon carbonate, silicon nitride, potassium titanate, basic magnesium sulfate, zinc oxide, graphite, calcium sulfate, magnesium borate, magnesium oxide, and a silicate mineral. Particularly, a silicate mineral is preferably used. Examples of commercially available products of silicate minerals include THIXOTROPIC AGENT DT 5039 (manufactured by Huntsman Japan K.K.).

Examples of internal release agents include a metallic soap, a polyethylene wax, vegetable waxes, such as carnauba wax, a fatty acid ester release agent, a silicone oil, an animal wax, and a fluorine nonionic surfactant. The amount of the internal release agent incorporated is preferably 0.1 to 5 parts by mass, further preferably 0.2 to 2 parts by mass, relative to 100 parts by mass of the epoxy resin. When the amount of the internal release agent is in the above range, a release effect from a mold is advantageously exhibited.

Examples of commercially available products of internal release agents include "MOLD WIZ (registered trademark)" INT1846 (manufactured by AXEL PLASTICS RESEARCH LABORATORIES INC.), Licowax S, Licowax P, Licowax OP, Licowax PE190, Licowax PED (manufactured by Clariant Japan K.K.), and stearyl stearate (SL-900A; manufactured by Riken Vitamin Co., Ltd.).

The resin composition used in the invention preferably has a resin viscosity at 80° C. of 1 to 1,000 Pa·sec, more preferably 10 to 800 Pa·sec, further preferably 100 to 500 Pa·sec. Further, the resin composition preferably has a resin viscosity at 120° C. of 0.1 to 100 Pa·sec, more preferably 1 to 80 Pa·sec, especially preferably 10 to 50 Pa·sec. When the resin viscosity of the resin composition is in the above range, a composite material having excellent toughness and impact resistance can be obtained. When the resin viscosity is too low, the resin is likely to flow out of the prepreg. On the other hand, when the resin viscosity is too high, an unimpregnated portion is likely to be formed in the prepreg, so that voids and the like are likely to be formed in the obtained fiber-reinforced composite material.

A cured resin obtained by curing the resin composition preferably has a glass transition temperature of 150° C. or higher, more preferably 170 to 400° C. When the glass transition temperature of the cured resin is lower than 150° C., the heat resistance is unsatisfactory, so that voids and the like are likely to be formed in the obtained fiber-reinforced composite material.

The thermosetting resin composition used in the invention can be produced by mixing together a thermosetting resin and, if necessary, a curing agent, a thermoplastic resin, and other components. The order of mixing these components is not limited, but it is preferred that the resin composition is produced by kneading a thermosetting resin and another component (at least a component to be dissolved in the thermosetting resin) in a state in which no curing agent is added at a temperature of 60° C. or higher for 10 minutes or more. When an epoxy resin is used as the matrix resin, the kneading temperature is more preferably 70 to 150° C., further preferably 90 to 140° C., especially preferably 100 to 130° C. The kneading time is more preferably 30 minutes or more. When the kneading temperature is too high, it is likely that a curing reaction partially proceeds, so that the impregnation properties into the reinforcing fiber substrate layer become poor, or the storage stability of the obtained resin composition and a prepreg produced using the composition becomes poor. When the kneading temperature is too low, the viscosity of the resin composition is likely to be so high that the mixing is substantially difficult.

With respect to the mixing machine, a conventionally known mixing machine can be used. Specific examples of mixing machines include a roll mill, a planetary mixer, a kneader, an extruder, a Banbury mixer, a mixing vessel having an agitating blade, and a horizontal mixing tank. Mixing the components can be carried out in air or in an inert gas atmosphere. When the mixing is carried out in air, an atmosphere having a temperature and humidity controlled is preferred. There is no particular limitation, but, for example, it is preferred that the mixing is carried out in an atmosphere having a temperature controlled to be a constant temperature of 30° C. or lower and having a relative humidity as low as 50% RH or less.

In the invention, with respect to the method for producing the prepreg, there is no particular limitation, and any method conventionally known can be employed. Specifically, a hot melt method or a solvent method can be preferably employed.

The hot melt method is a method in which the resin composition is applied in a thin film form onto release paper to form a resin composition film, and the resin composition film is laminated on a reinforcing fiber substrate, and the resultant laminate is heated under a pressure so that the reinforcing fiber substrate layer is impregnated with the resin composition.

With respect to the method for forming the resin composition into a resin composition film, there is no particular limitation, and any method conventionally known can be used. Specifically, a resin composition film can be obtained by flow-casting the resin composition onto a support, such as release paper or a film, using an extruder die, an applicator, a reverse roll coater, a comma coater, or the like. The resin temperature at which the film is produced is appropriately determined according to the composition or viscosity of the resin composition. Specifically, the same temperature conditions as the mixing temperature in the above-mentioned method for producing the epoxy resin composition are preferably used. The impregnation of the reinforcing fiber substrate layer with the resin composition may be performed either once or two or more times.

The solvent method is a method in which the resin composition in the form of a varnish is prepared using an appropriate solvent, and the reinforcing fiber substrate layer is impregnated with the resultant varnish.

The prepreg of the invention can be preferably produced by a hot melt method using no solvent among the above conventional methods.

When an epoxy resin is used as the matrix resin, the impregnation temperature at which the reinforcing fiber substrate layer is impregnated with the resin composition film by a hot melt method is preferably in the range of from 50 to 140° C. When the impregnation temperature is too low, it is likely that the viscosity of the epoxy resin is such high that the reinforcing fiber substrate layer is not satisfactorily impregnated with the epoxy resin. When the impregnation temperature is too high, it is likely that a curing reaction of the epoxy resin composition proceeds, so that the storage stability of the obtained prepreg becomes poor, or the draping properties become poor. The impregnation temperature is more preferably 60 to 135° C., especially preferably 70 to 130° C.

The impregnation pressure under which the reinforcing fiber substrate layer is impregnated with the epoxy resin composition film by a hot melt method is appropriately determined taking into consideration the viscosity, resin flow, and the like of the resin composition. A specific impregnation pressure is 1 to 50 (kN/cm), preferably 2 to 30 (kN/cm).

A fiber-reinforced composite material can be obtained by molding and curing the prepreg of the invention. As examples of the method for producing a fiber-reinforced composite material using the prepreg of the invention, there can be mentioned known molding methods, such as autoclave molding and press molding.

As a method for producing a fiber-reinforced composite material from the prepreg of the invention, an autoclave molding method is preferably used. The autoclave molding method is a molding method in which the prepreg and a film bag are successively placed in a bottom force of a mold, and the prepreg is sealed between the bottom force and the film bag, and the space defined by the bottom force and the film bag is made in a vacuum and heated and pressed using an autoclave molding machine. Conditions for the molding are preferably such that the temperature increase rate is 1 to 50° C./minute and heating and pressing are conducted at 0.2 to 0.7 MPa at 130 to 180° C. for 10 to 150 minutes.

Further, as a method for producing a fiber-reinforced composite material using the prepreg of the invention, a press molding method is also preferably used. The production of a fiber-reinforced composite material by a press molding method is performed using a mold by heating and pressing the prepreg of the invention or a preform formed by laminating the prepreg of the invention. The mold is preferably preliminarily heated to the curing temperature.

The temperature of the mold during the press molding is preferably 150 to 210° C. When the molding temperature is 150° C. or higher, a curing reaction can be caused satisfactorily, so that a fiber-reinforced composite material can be obtained with high productivity. Further, when the molding temperature is 210° C. or less, the resin viscosity does not become too low, and it is possible to prevent the resin from excessively flowing in the mold. As a result, flowing of the resin out of the mold and meandering of the fiber can be suppressed, making it possible to obtain a fiber-reinforced composite material having high quality.

The pressure during the molding is 0.05 to 2 MPa. When the pressure is 0.05 MPa or more, appropriate fluidity of the resin can be obtained, making it possible to prevent the occurrence of poor appearance or formation of voids. Further, the prepreg is brought into close contact with the mold, and therefore a fiber-reinforced composite material having excellent appearance can be produced. When the pressure is 2 MPa or less, the resin does not excessively flow, and hence the obtained fiber-reinforced composite material is unlikely to have poor appearance. In addition, no excessive load is exerted on the mold, and therefore deformation of the mold or the like is unlikely to occur. The molding time is preferably 0.5 to 8 hours.

The fiber-reinforced composite material which is still another embodiment of the invention can be produced not only by the above-mentioned method using the prepreg of the invention but also by a known means or method using no prepreg, such as resin transfer molding (RTM method), filament winding molding, or injection molding, using the carbon fiber of the invention.

With respect to the method for producing the fiber-reinforced composite material of the invention, from the viewpoint of efficiently obtaining the fiber-reinforced composite material having a complicated form, an RTM method is preferably used. The RTM method means a method in which a reinforcing fiber substrate placed in a mold is impregnated with a matrix resin composition in a liquid state to obtain a fiber-reinforced composite material.

In the invention, with respect to the mold used in the RTM method, a closed mold made of a rigid material may be used, or an open mold made of a rigid material and a flexible film (bag) can be used. In the latter, the reinforcing fiber substrate can be disposed between the open mold made of a rigid material and the flexible film. As the rigid material, various types of existing materials, e.g., metals, such as steel and aluminum, a fiber-reinforced plastic (FRP), wood, and gypsum are used. As a material for the flexible film, polyamide, polyimide, polyester, a fluororesin, a silicone resin, and the like are used.

In the RTM method, when the closed mold made of a rigid material is used, generally, the mold is closed by pressing and the matrix resin composition is poured by pressing. In this instance, apart from the pour inlet, a vacuum port can be formed and connected to a vacuum pump to make suction. Suction makes it possible to pour the matrix resin composition just under atmospheric pressure without using a special pressing means. This method is advantageous in that forming a plurality of vacuum ports enables production of a large-size member, and thus can be preferably used.

In the RTM method, when the open mold made of a rigid material and the flexible film are used, the matrix resin may be poured just under atmospheric pressure by suction without using a special pressing means. For achieving excellent impregnation by pouring the matrix resin just under atmospheric pressure, the use of a resin diffusing medium is effective. Further, before disposing the reinforcing fiber substrate, a gel coat is preferably applied to the surface of the rigid material.

In the RTM method, when a thermosetting resin is used as the matrix resin, the reinforcing fiber substrate is impregnated with the thermosetting resin composition, and then subjected to heat-curing. With respect to the mold temperature during the heat-curing, a temperature higher than the mold temperature during pouring the thermosetting resin composition is generally selected. When an epoxy resin is used as the matrix resin, the mold temperature during the heat-curing is preferably 80 to 200° C. The time for heat-curing is preferably one minute to 20 hours. After completion of the heat-curing, demolding is carried out to remove the fiber-reinforced composite material from the mold. Then, the obtained fiber-reinforced composite material may be subjected to postcuring by heating it to a higher temperature. The temperature for postcuring is preferably 150 to 200° C., and the time for postcuring is preferably one minute to 4 hours.

The impregnation pressure under which the reinforcing fiber substrate is impregnated with the resin composition by an RTM method is appropriately determined taking into consideration the viscosity, resin flow, and the like of the resin composition.

A specific impregnation pressure is 0.001 to 10 MPa, preferably 0.01 to 1 MPa. When the fiber-reinforced composite material is obtained using an RTM method, the viscosity of the resin composition at 100° C. is preferably less than 5,000 mPa·sec, more preferably 1 to 1,000 mPa·sec.

The fiber-reinforced composite material obtained in the invention is a composite material which is well impregnated with the resin, and which has high strength development rate and excellent mechanical properties, and can be widely applied to various uses, such as a sporting goods use, a leisure goods use, a general industrial use, an aircraft and aerospace use, and an automobile use.

EXAMPLES

Carbon fibers were prepared under the conditions described in the following Examples and Comparative Examples. With respect to the prepared carbon fibers, values of various physical properties were measured by the methods described below.

<Specific Heat Capacity of an Oxidized Fiber>

The measurement was conducted using a differential scanning calorimeter (DSC) in accordance with JIS K7123.

<Method for Measuring a Strand Strength and a Strand Modulus of a Carbon Fiber Impregnated with a Resin>

The measurement was conducted in accordance with the method described in JIS R 7608 (ISO 10618).

<Method for Measuring the Filament Diameter of a Carbon Fiber>

The measurement was conducted in accordance with the method described in JIS R 7607. JIS R 7607 is the Japanese Industrial Standards corresponding to ISO 11567.

<Method for Measuring a Specific Gravity of a Carbon Fiber>

A specific gravity (density) of a carbon fiber was measured in accordance with the method described in JIS R 7603 (ISO 10119).

<Crystallite Size and Orientation Degree>

Using an X-ray diffraction apparatus RINT2000, manufactured by Rigaku Corporation, from a half band width 0 of a diffraction peak at the index of plane (002) measured by a transmission method, a crystallite size Lc was determined by making a calculation using the following formula (4):

$$\text{Crystallite size } Lc \text{ (nm)} = 0.9\lambda/\beta \cos \theta \qquad (4)$$

λ: a wavelength of the X-ray,
β: a half band width, and
θ: an angle of diffraction.

Further, from half band widths $H_{1/2}$ and $H'_{1/2}$ (derived from the strength distribution) of two peaks obtained by scanning this diffraction peak angle in the circumferential direction, a crystal orientation degree was determined by making a calculation using the following formula (5):

$$\text{Crystal orientation degree (\%)} = 100 \times [360 - (H_{1/2} - H'_{1/2})]/360 \qquad (5)$$

$H_{1/2}$ and $H'_{1/2}$: a half band width.

<Method for Evaluating the CF Fluff Quality>

A carbon fiber bundle was allowed to travel between urethane sheets having a weight of 125 g placed thereon at a speed of 50 feet/minute for 2 minutes, and an amount of the carbon fiber remaining on the urethane sheets was measured. When the amount of the carbon fiber remaining on the urethane sheets was 40 μg/ft or less, the fluff quality was judged excellent (0). When the amount of the carbon fiber remaining on the urethane sheets was more than 40 to 60 μg/ft, the fluff quality was judged slightly poor (A), and, when the amount of the carbon fiber remaining on the urethane sheets was more than 60 μg/ft after travelling or no carbon fiber was obtained during production, the fluff quality was judged poor (x).

<0° Tensile Test for Composite Material>
<Resin Composition>
[Components]
(Epoxy Resin)

MY0600: Glycidylamine epoxy resin, Araldite MY0600 (trade name), manufactured by Huntsman Advanced Materials K.K. . . . 35 Parts by weight EP604: Glycidylamine epoxy resin, EP604 (trade name), manufactured by Japan Epoxy Resins Co., Ltd. . . . 30 Parts by weight EP828: Bisphenol A epoxy resin, EP828 (trade name), manufactured by Japan Epoxy Resins Co., Ltd. . . . 15 Parts by weight EPU-6: Urethane-modified epoxy resin, EPU-6 (trade name), manufactured by Adeka Corporation . . . 20 Parts by weight Aromatic amine curing agent: 4,4'-Diaminodiphenyl sulfone (SEIKACURE S (trade name)), manufactured by Wakayama Seika Kogyo Co., Ltd. . . . 40 Parts by weight Polyether sulfone: PES-5003P (trade name), manufactured by Sumitomo Chemical Co., Ltd. . . . 35 Parts by weight Polyamide resin particles: Grilamid TR-55 (trade name), manufactured by EMS-CHEMIE Japan Ltd. . . . 20 Parts by weight <Preparation of a Resin Composition>

Polyether sulfone was added to an epoxy resin, and the resultant mixture was stirred using a planetary mixer at 120° C. for 60 minutes to completely dissolve the polyether sulfone in the epoxy resin. The resin temperature was lowered to 80° C. or lower, and then polyamide resin particles and a curing agent were added and the resultant mixture was kneaded using a roll mill to prepare an epoxy resin composition.

<Production of a Prepreg>

The prepared epoxy resin composition was applied using a film coater onto release paper to form two resin films at 50 g/m². Then, the formed resin films were respectively laminated on both surfaces of a carbon fiber sheet having carbon fiber bundles unidirectionally oriented. The resultant laminate was heated and pressed so that the carbon fiber sheet was impregnated with the resin, preparing a unidirectional prepreg having a carbon fiber areal weight of 190 g/m² and a matrix resin mass percentage of 35.0%.

<0° Tensile Properties (0TS)>

The prepared unidirectional prepregs were laminated so that the thickness of the formed laminate became 1 mm, and then cured at 180° C. to obtain a fiber-reinforced composite material. With respect to the obtained fiber-reinforced composite material, a tensile test was performed at room temperature in accordance with ASTM D 303. The strength obtained in this test was taken as a 0° tensile strength, and a strength development rate (0TS development rate) was determined based on the formula (6) below. In addition, a 0° tensile modulus (0TM) was measured.

$$0TS \text{ Development rate} = 0TS \div (TS \times V_f) \quad (6)$$

0TS: 0° Tensile strength (MPa)
TS: Strand tensile strength (MPa)
$V_f$: Volume content of the carbon fiber in the fiber-reinforced composite material The 0TS development rate is preferably 88% or more, more preferably 90% or more. The 0TM is preferably 155 GPa or more, more preferably 160 GPa or more.

<In-Plane Shear Stress (IPSS)>

The 8 unidirectional prepregs prepared were laminated so that the direction of the fiber became [+45°/−45°/−45°/+45°/+45°/−45°/−45°/+45°], and then cured at 180° C. to obtain a composite having a carbon fiber volume content of 60%. With respect to the obtained composite, an in-plane shear stress (IPSS) was measured in accordance with the ±45° direction tension method described in JIS K 7079. The IPSS is preferably more than 75 MPa, more preferably 80 MPa or more.

Example 1

As a precursor fiber, a polyacrylonitrile fiber (total fineness: 3,067 tex) having a filament fineness of 1.2 dtex and 24,000 filaments was subjected to oxidization treatment in air at 240° C. until the fiber density became 1.35 g/cm³, obtaining an oxidized fiber having a filament diameter of 11.3 μm. Then, the obtained oxidized fiber was subjected to first carbonization treatment in a nitrogen gas atmosphere in a first carbonizing furnace having the highest temperature of 600° C. to obtain a first carbonized fiber having a filament diameter of 8.5 μm. The obtained first carbonized fiber was subjected to second carbonization treatment in a nitrogen atmosphere in a second carbonizing furnace having an inlet temperature of 600° C. and the highest temperature of 1,580° C. for 160 seconds to obtain a carbon fiber having a filament diameter of 6.8 μm. The obtained carbon fiber was subjected to surface treatment by electrolytic oxidation in an aqueous solution of ammonium sulfate at an electrical quantity of 20 C/g, and then subjected to sizing treatment with an epoxy resin. The physical properties of the obtained carbon fiber are shown in Table 1.

Example 2

A carbon fiber was obtained in substantially the same manner as in Example 1 except that the highest temperature of the first carbonizing furnace was changed to 640° C., and that the highest temperature of the second carbonizing furnace was changed to 1,670° C. The physical properties of the obtained carbon fiber are shown in Table 1.

Comparative Example 1

A carbon fiber was obtained in substantially the same manner as in Example 1 except that a polyacrylonitrile fiber having a filament fineness of 0.64 dtex (total fineness: 1,707 tex) was used as a precursor fiber, and that the highest temperature of the second carbonizing furnace was changed to 1,470° C. The physical properties of the obtained carbon fiber are shown in Table 1. The obtained carbon fiber did not satisfy any of the values in the formulae (1) and (2), and thus was a carbon fiber which does not satisfy the requirement of the present invention. A prepreg was prepared using the carbon fiber in Comparative Example 1, and a 0° tensile strength of the composite material was measured. However, the carbon fiber in Comparative Example 1 does not satisfy the values in the formulae (1) and (2), and hence a strength development rate of the carbon fiber relative to the 0° tensile strength was as low as 81.3%.

TABLE 1

|  |  | Example 1 | Example 2 | Comparative Example 1 |
| --- | --- | --- | --- | --- |
| Precursor fiber: Filament fineness | denier | 1.15 | 1.15 | 0.64 |
| First carbonizing furnace: Highest temperature | ° C. | 600 | 640 | 640 |
| Second carbonizing furnace: Inlet temperature | ° C. | 600 | 600 | 600 |
| Second carbonizing furnace: Highest temperature | ° C. | 1580 | 1670 | 1470 |
| Second carbonizing furnace: Residence time | min. | 2.7 | 2.7 | 2.2 |
| Strand tensile strength (TS) | MPa | 5100 | 5000 | 6000 |
| Strand tensile modulus (TM) | GPa | 277 | 280 | 290 |
| X-Ray crystallite size (Lc) | Å | 19.4 | 19.8 | 18.1 |
| X-Ray crystal lattice spacing | Å | 3.537 | 3.536 | 3.53 |
| X-Ray crystal orientation degree | % | 81.5 | 81.8 | 81.9 |

TABLE 1-continued

|  |  | Example 1 | Example 2 | Comparative Example 1 |
|---|---|---|---|---|
| Specific gravity | g/cm$^3$ | 1.76 | 1.74 | 1.78 |
| Fiber diameter | μm | 6.8 | 6.8 | 4.8 |
| Formula (1) Lc/d |  | 2.9 | 2.9 | 3.8 |
| Formula (2) TS*d*Lc | ×10$^5$ | 6.7 | 6.7 | 5.2 |
| Formula (3) TS*d*TM | ×10$^6$ | 9.6 | 9.5 | 8.4 |
| Composite material: 0TS Development rate | % | 89.0 | 91.7 | 81.3 |

Example 3

As a precursor fiber, a polyacrylonitrile fiber (total fineness: 3,067 tex) having a filament fineness of 1.2 dtex, a filament diameter of 11.7 μm, and 24,000 filaments was used. The precursor fiber was subjected to oxidization treatment in air at 240° C. until the fiber density became 1.35 g/cm$^3$ to obtain an oxidized fiber having a filament diameter of 11.3 μm. The obtained oxidized fiber had a specific heat capacity of 0.904 J/g·K.

Then, the obtained oxidized fiber was subjected to first carbonization treatment in a nitrogen gas atmosphere in a first carbonizing furnace having the highest temperature of 640° C. to obtain a first carbonized fiber having a filament diameter of 8.5 μm. The obtained first carbonized fiber was further subjected to second carbonization treatment in a nitrogen atmosphere in a second carbonizing furnace having an inlet temperature of 600° C. and the highest temperature of 1,580° C. for 160 seconds (2.7 minutes) while applying a tension of 188 mg/dtex to the fiber, obtaining a carbon fiber having a filament diameter of 6.8 μm. Throughout the first carbonization treatment and second carbonization treatment, the temperature gradient was 365° C./min and the integral quantity of heat given to the fiber was 101 J·h/g.

The obtained carbon fiber was subjected to surface treatment by electrolytic oxidation in an aqueous solution of ammonium sulfate at an electrical quantity of 20 C/g, and then subjected to sizing treatment with an epoxy resin. The physical properties of the obtained carbon fiber are shown in Table 2.

The obtained carbon fiber was a carbon fiber which satisfies the values in the formula (1) and the formula (2), and which has excellent quality such that the fiber has less fluff. Using the obtained carbon fiber, the composite material physical properties were evaluated.

The composite material using the carbon fiber obtained in Example 3 was a composite material having excellent mechanical physical properties such that the 0TS development rate is as high as 89.5%, the 0TM is as high as 160 GPa, and the IPSS is more than 80 MPa.

Example 4

A carbon fiber was obtained in substantially the same manner as in Example 3 except that the tension in the second carbonizing furnace was changed to 200 mg/dtex, that the highest temperature of the second carbonizing furnace was changed to 1,650° C., and that, throughout the first carbonization treatment and second carbonization treatment, the temperature gradient was changed to 391° C./min and the integral quantity of heat was changed to 102 J·h/g. The physical properties of the obtained carbon fiber are shown in Table 2.

The obtained carbon fiber was a carbon fiber which satisfies the values in the formula (1) and the formula (2), and which has excellent quality such that the fiber has less fluff. Using the obtained carbon fiber, the composite material physical properties were evaluated.

The composite material using the carbon fiber obtained in Example 4 was a composite material having excellent mechanical physical properties such that the 0TS development rate is as very high as 91.9%, the 0TM is more than 160 GPa, and the IPSS is more than 75 MPa.

Example 5

Substantially the same polyacrylonitrile fiber as in Example 3 except that the number of filaments was changed to 12,000 (total fineness: 1,533 tex) was used. A carbon fiber was obtained in substantially the same manner as in Example 3 except that the highest temperature of the first carbonizing furnace was changed to 600° C., that the highest temperature of the second carbonizing furnace was changed to 1,650° C., and that, throughout the first carbonization treatment and second carbonization treatment, the temperature gradient was changed to 389° C./min and the integral quantity of heat was changed to 102 J·h/g. The physical properties of the obtained carbon fiber are shown in Table 2.

The obtained carbon fiber was a carbon fiber which satisfies the values in the formula (1) and the formula (2), and which has excellent quality such that the fiber has less fluff. Using the obtained carbon fiber, the composite material physical properties were evaluated.

The composite material using the carbon fiber obtained in Example 5 was a composite material having excellent mechanical physical properties such that the 0TS development rate is as very high as 90.2%, the 0TM is more than 160 GPa, and the IPSS is more than 75 MPa.

Example 6

Substantially the same polyacrylonitrile fiber as in Example 3 except that the number of filaments was changed to 48,000 (total fineness: 6,133 tex) was used. A carbon fiber was obtained in substantially the same manner as in Example 3 except that the highest temperature of the first carbonizing furnace was changed to 600° C., that the tension in the second carbonizing furnace was changed to 172 mg/dtex, that the highest temperature of the second carbonizing furnace was changed to 1,650° C., and that, throughout the first carbonization treatment and second carbonization treatment, the temperature gradient was changed to 389° C./min and the integral quantity of heat was changed to 102 J·h/g. The physical properties of the obtained carbon fiber are shown in Table 2.

The obtained carbon fiber was a carbon fiber which satisfies the values in the formula (1) and the formula (2), and which has excellent quality such that the fiber has less fluff. Using the obtained carbon fiber, the composite material physical properties were evaluated.

The composite material using the carbon fiber obtained in Example 6 was a composite material having excellent mechanical physical properties such that the OTS development rate is as very high as 91.2%, the OTM is more than 160 GPa, and the IPSS is more than 75 MPa.

Example 7

Substantially the same polyacrylonitrile fiber (total fineness: 4,000 tex) as in Example 3 except that the filament diameter was changed to 13.6 μm was used. A carbon fiber was obtained in substantially the same manner as in Example 3 except that the highest temperature of the first carbonizing furnace was changed to 600° C., that the tension in the second carbonizing furnace was changed to 183 mg/dtex, that the highest temperature of the second carbonizing furnace was changed to 1,650° C., and that, throughout the first carbonization treatment and second carbonization treatment, the temperature gradient was changed to 389° C./min and the integral quantity of heat was changed to 102 J·h/g. The physical properties of the obtained carbon fiber are shown in Table 2.

The obtained carbon fiber was a carbon fiber which satisfies the values in the formula (1) and the formula (2), and which has excellent quality such that the fiber has less fluff. Using the obtained carbon fiber, the composite material physical properties were evaluated.

The composite material using the carbon fiber obtained in Example 7 was a composite material having excellent mechanical physical properties such that the OTS development rate is as very high as 90.5%, the OTM is as high as 160 GPa, and the IPSS is more than 75 MPa.

As apparent from the above, all the carbon fibers obtained by the method for producing a carbon fiber of the invention were the carbon fiber of the invention which satisfies the values in the formula (1) and the formula (2), and which has excellent quality such that the fiber has less fluff. All the obtained carbon fibers of the invention had high OTS development rate, and the composite material using the carbon fiber of the invention was a composite material having excellent mechanical physical properties such that both the OTM and IPSS are high values.

TABLE 2

|  |  | Example 3 | Example 4 | Example 5 | Example 6 | Example 7 |
|---|---|---|---|---|---|---|
| Precursor fiber bundle fineness | tex | 3067 | 3067 | 1533 | 6133 | 4000 |
| Precursor fiber: Filament diameter | μm | 11.7 | 11.7 | 11.7 | 11.7 | 13.6 |
| Number of filaments | Filaments | 24000 | 24000 | 12000 | 48000 | 24000 |
| oxidized fiber: Specific gravity | g/cm$^3$ | 1.35 | 1.35 | 1.35 | 1.35 | 1.35 |
| First carbonizing furnace: Highest temperature | ° C. | 640 | 640 | 600 | 600 | 600 |
| Second carbonizing furnace: Inlet temperature | ° C. | 600 | 600 | 600 | 600 | 600 |
| Second carbonizing furnace: Highest temperature | ° C. | 1580 | 1650 | 1650 | 1650 | 1650 |
| Second carbonizing furnace: Residence time | min. | 2.7 | 2.7 | 2.7 | 2.7 | 2.7 |
| Second carbonizing furnace: Tension | mg/dtex | 188 | 200 | 188 | 172 | 183 |
| Carbonization step: Integral quantity of heat | J · h/g | 101 | 102 | 102 | 102 | 102 |
| Carbonization step: Temperature gradient | ° C./min | 365 | 391 | 389 | 389 | 389 |
| Carbon fiber bundle fineness | tex | 1600 | 1600 | 800 | 3200 | 2080 |
| Strand tensile strength (TS) | MPa | 5200 | 5000 | 5200 | 4900 | 4800 |
| Strand tensile modulus (TM) | GPa | 277 | 279 | 280 | 280 | 277 |
| X-Ray crystallite size (Lc) | Å | 19.3 | 19.7 | 19.7 | 19.7 | 19.6 |
| X-Ray crystal orientation degree | % | 81.5 | 81.8 | 81.9 | 81.8 | 81.5 |
| Specific gravity | g/cm$^3$ | 1.76 | 1.74 | 1.74 | 1.74 | 1.73 |
| Fiber diameter | μm | 6.8 | 6.8 | 6.8 | 6.8 | 8.0 |
| Formula (1) Lc/d | — | 2.8 | 2.9 | 2.9 | 2.9 | 2.5 |
| Formula (2) TS*d*Lc | ×10$^5$ | 6.8 | 6.7 | 7.0 | 6.6 | 7.5 |
| Formula (3) TS*d*TM | ×10$^6$ | 9.8 | 9.5 | 9.9 | 9.3 | 10.6 |
| CF Fluff quality | — | ○ | ○ | ○ | ○ | ○ |
| Composite material: OTS Development rate | % | 89.5 | 91.9 | 90.2 | 91.2 | 90.5 |
| Composite material: OTM | GPa | 160 | 162 | 162 | 161 | 160 |
| Composite material: IPSS | MPa | 82 | 78 | 78 | 76 | 76 |

Comparative Example 2

A carbon fiber was obtained in substantially the same manner as in Example 3 except that the highest temperature of the first carbonizing furnace was changed to 600° C., that the tension in the second carbonizing furnace was changed to 153 mg/dtex which does not satisfy the requirement of the invention, that the highest temperature of the second carbonizing furnace was changed to 1,370° C., and that, throughout the first carbonization treatment and second carbonization treatment, the temperature gradient was changed to 286° C./min which does not satisfy the requirement of the invention and the integral quantity of heat was changed to 97 J·h/g. The physical properties of the obtained carbon fiber are shown in Table 3.

The carbon fiber obtained in Comparative Example 2 which does not satisfy the requirement of the method for producing a carbon fiber of the invention was a carbon fiber which does not satisfy the value in the formula (2). Using the obtained carbon fiber, the composite material physical properties were evaluated.

The composite material using the carbon fiber obtained in Comparative Example 2, which does not satisfy the value in the formula (2), was a composite material having poor mechanical physical properties such that the 0TM is as low as 153 GPa.

Comparative Example 3

Substantially the same polyacrylonitrile fiber (total fineness: 1,707 tex) as in Example 3 except that the filament diameter was changed to 8.8 μm was used. A carbon fiber was obtained in substantially the same manner as in Example 3 except that the tension in the second carbonizing furnace was changed to 193 mg/dtex, that the highest temperature of the second carbonizing furnace was changed to 1,470° C., that the residence time in the second carbonizing furnace was changed to 130 seconds (2.2 minutes), and that, throughout the first carbonization treatment and second carbonization treatment, the temperature gradient was changed to 395° C./min and the integral quantity of heat was changed to 74 J·h/g which does not satisfy the requirement of the invention. The physical properties of the obtained carbon fiber are shown in Table 3.

The carbon fiber obtained in Comparative Example 3 which does not satisfy the requirement of the method for producing a carbon fiber of the invention was a carbon fiber which does not satisfy the values in both the formula (1) and the formula (2). Using the obtained carbon fiber, the composite material physical properties were evaluated.

The carbon fiber obtained in Comparative Example 3, which does not satisfy the values in the formula (1) and the formula (2), was a carbon fiber having a 0TS development rate as very low as 81.3%.

Comparative Example 4

A carbon fiber was obtained in substantially the same manner as in Example 3 except that the highest temperature of the first carbonizing furnace was changed to 600° C., that the tension in the second carbonizing furnace was changed to 183 mg/dtex, that the highest temperature of the second carbonizing furnace was changed to 1,850° C., and that, throughout the first carbonization treatment and second carbonization treatment, the temperature gradient was changed to 463° C./min and the integral quantity of heat was changed to 108 J·h/g which does not satisfy the requirement of the invention. The physical properties of the obtained carbon fiber are shown in Table 3.

The carbon fiber obtained in Comparative Example 4 which does not satisfy the requirement of the integral quantity of heat in the method for producing a carbon fiber of the invention was a carbon fiber which does not satisfy the value in the formula (1). Using the obtained carbon fiber, the composite material physical properties were evaluated.

The carbon fiber obtained in Comparative Example 4, which does not satisfy the value in the formula (1), was a carbon fiber having a 0TS development rate as very low as 85.0%.

Comparative Example 5

Substantially the same polyacrylonitrile fiber (total fineness: 4,000 tex) as in Example 3 except that the filament diameter was changed to 13.6 μm was used. Production of a carbon fiber was attempted in substantially the same manner as in Example 3 except that the highest temperature of the first carbonizing furnace was changed to 600° C., that the tension in the second carbonizing furnace was changed to 185 mg/dtex, that the highest temperature of the second carbonizing furnace was changed to 1,850° C., and that, throughout the first carbonization treatment and second carbonization treatment, the temperature gradient was changed to 463° C./min and the integral quantity of heat was changed to 108 J·h/g which does not satisfy the requirement of the invention. However, in Comparative Example 5 which does not satisfy the requirement of the integral quantity of heat in the method for producing a carbon fiber of the invention, many fiber breakages occurred in the carbonization step, so that stable production could not be achieved, making it impossible to obtain a carbon fiber.

TABLE 3

| | | Comparative Example 2 | Comparative Example 3 | Comparative Example 4 | Comparative Example 5 |
|---|---|---|---|---|---|
| Precursor fiber bundle fineness | tex | 3067 | 1707 | 3067 | 4000 |
| Precursor fiber: Filament diameter | μm | 11.7 | 8.8 | 11.7 | 13.6 |
| Number of filaments | Filaments | 24000 | 24000 | 24000 | 24000 |
| oxidized fiber: Specific gravity | g/cm³ | 1.35 | 1.35 | 1.35 | 1.35 |
| First carbonizing furnace: Highest temperature | ° C. | 600 | 640 | 600 | 600 |
| Second carbonizing furnace: Inlet temperature | ° C. | 600 | 600 | 600 | 600 |
| Second carbonizing furnace: Highest temperature | ° C. | 1370 | 1470 | 1850 | 1850 |
| Second carbonizing furnace: Residence time | min. | 2.7 | 2.2 | 2.7 | 2.7 |
| Second carbonizing furnace: Tension | mg/dtex | 153 | 193 | 183 | 185 |
| Carbonization step: Integral quantity of heat | J · h/g | 97 | 74 | 108 | 108 |
| Carbonization step: Temperature gradient | ° C./min | 286 | 395 | 463 | 463 |
| Carbon fiber bundle fineness | tex | 1630 | 830 | 1585 | 2050 |
| Strand tensile strength (TS) | MPa | 5100 | 6000 | 5000 | — |
| Strand tensile modulus (TM) | GPa | 265 | 290 | 285 | — |
| X-Ray crystallite size (Lc) | Å | 17.1 | 18.1 | 22.0 | — |
| X-Ray crystal orientation degree | % | 80.6 | 81.9 | 83.5 | — |
| Specific gravity | g/cm³ | 1.81 | 1.78 | 1.72 | — |
| Fiber diameter | μm | 6.8 | 4.8 | 6.7 | — |

TABLE 3-continued

|  | | Comparative Example 2 | Comparative Example 3 | Comparative Example 4 | Comparative Example 5 |
|---|---|---|---|---|---|
| Formula (1) Lc/d | | — | 2.5 | 3.8 | 3.3 |
| Formula (2) TS*d*Lc | ×$10^5$ | 5.9 | 5.2 | 7.4 | — |
| Formula (3) TS*d*TM | ×$10^6$ | 9.2 | 8.4 | 9.5 | — |
| CF Fluff quality | | — | ○ | ○ | ○ | x |
| Composite material: 0TS Development rate | % | 89.2 | 81.3 | 85.0 | — |
| Composite material: 0TM | GPa | 153 | 165 | 164 | — |
| Composite material: IPSS | MPa | 78 | 81 | 69 | — |

Comparative Example 6

Production of a carbon fiber was attempted in substantially the same manner as in Example 3 except that the highest temperature of the first carbonizing furnace was changed to 600° C., that the tension in the second carbonizing furnace was changed to 281 mg/dtex which does not satisfy the requirement of the invention, that the highest temperature of the second carbonizing furnace was changed to 1,650° C., and that, throughout the first carbonization treatment and second carbonization treatment, the temperature gradient was changed to 389° C./min and the integral quantity of heat was changed to 102 J·h/g. However, in Comparative Example 6 which does not satisfy the requirement of the tension in the second carbonization in the method for producing a carbon fiber of the invention, many fiber breakages occurred in the carbonization step, so that stable production could not be achieved, making it impossible to obtain a carbon fiber.

Comparative Example 7

A carbon fiber was obtained in substantially the same manner as in Example 3 except that the tension in the second carbonizing furnace was changed to 94 mg/dtex which does not satisfy the requirement of the invention, that the highest temperature of the second carbonizing furnace was changed to 1,650° C., and that, throughout the first carbonization treatment and second carbonization treatment, the temperature gradient was changed to 389° C./min and the integral quantity of heat was changed to 102 J·h/g. The physical properties of the obtained carbon fiber are shown in Table 4.

The carbon fiber obtained in Comparative Example 8 which does not satisfy the requirement of the method for producing a carbon fiber of the invention was a carbon fiber which does not satisfy the value in the formula (2). Using the obtained carbon fiber, the composite material physical properties were evaluated.

The composite material using the carbon fiber obtained in Comparative Example 7, which does not satisfy the value in the formula (2), was a composite material having poor mechanical physical properties such that the IPSS is as low as 75 MPa.

Comparative Example 8

A carbon fiber was obtained in substantially the same manner as in Example 3 except that the tension in the second carbonizing furnace was changed to 200 mg/dtex, that the inlet temperature of the second carbonizing furnace was changed to 1,000° C., that the highest temperature of the second carbonizing furnace was changed to 1,650° C., and that, throughout the first carbonization treatment and second carbonization treatment, the temperature gradient was changed to 241° C./min which does not satisfy the requirement of the invention and the integral quantity of heat was changed to 110 J·h/g. The physical properties of the obtained carbon fiber are shown in Table 4.

The carbon fiber obtained in Comparative Example 8 which does not satisfy the requirement of the method for producing a carbon fiber of the invention was a carbon fiber which does not satisfy the value in the formula (1). Using the obtained carbon fiber, the composite material physical properties were evaluated.

The composite material using the carbon fiber obtained in Comparative Example 8, which does not satisfy the value in the formula (1), was a composite material having poor mechanical physical properties such that the IPSS is as low as 70 MPa.

Comparative Example 9

The same precursor fiber as in Example 3 was subjected to oxidization treatment in air at 240° C. until the fiber density became 1.32 g/cm³ to obtain an oxidized fiber. Production of a carbon fiber was attempted in substantially the same manner as in Example 3 except that the highest temperature of the first carbonizing furnace was changed to 600° C., that the tension in the second carbonizing furnace was changed to 193 mg/dtex, that the highest temperature of the second carbonizing furnace was changed to 1,650° C., and that, throughout the first carbonization treatment and second carbonization treatment, the temperature gradient was changed to 389° C./min and the integral quantity of heat was changed to 102 Jth/g. However, in Comparative Example 9 in which the oxidization treatment was conducted until the fiber density became only 1.32 g/cm³, many fiber breakages occurred in the carbonization step, so that stable production could not be achieved, making it impossible to obtain a carbon fiber.

Comparative Example 10

The same precursor fiber as in Example 3 was subjected to oxidization treatment in air at 240° C. until the fiber density became 1.39 g/cm³ to obtain an oxidized fiber. A carbon fiber was obtained in substantially the same manner as in Example 3 except that the highest temperature of the first carbonizing furnace was changed to 600° C., that the tension in the second carbonizing furnace was changed to 191 mg/dtex, that the highest temperature of the second carbonizing furnace was changed to 1,650° C., and that, throughout the first carbonization treatment and second carbonization treatment, the temperature gradient was changed to 389° C./min and the integral quantity of heat was changed to 102 J·h/g. The physical properties of the obtained carbon fiber are shown in Table 4.

The carbon fiber obtained in Comparative Example 10 in which the oxidization treatment was conducted until the fiber density became 1.39 g/cm³ was a carbon fiber which does not satisfy the value in the formula (2). Using the obtained carbon fiber, the composite material physical properties were evaluated.

The composite material using the carbon fiber obtained in Comparative Example 10, which does not satisfy the value in the formula (2), was a composite material having poor mechanical physical properties such that the IPSS is as low as 75 MPa.

completely dissolve the polyether sulfone in the epoxy resin. Then, the temperature was lowered to 80° C., and a curing agent and epoxy resin-insoluble thermoplastic resin particles were added and the resultant mixture was mixed for 30 minutes to prepare an epoxy resin composition. The viscosities of the obtained epoxy resin at 80° C. and at 120° C. are shown in Table 5.

Using a reverse roll coater, the obtained epoxy resin composition was applied onto release paper to form two resin films having a weight per unit of 50 g/m². Then, the carbon fiber obtained in Example 3 was unidirectionally

TABLE 4

|  |  | Comparative Example 6 | Comparative Example 7 | Comparative Example 8 | Comparative Example 9 | Comparative Example 10 |
|---|---|---|---|---|---|---|
| Precursor fiber bundle fineness | tex | 3067 | 3067 | 3067 | 3067 | 3067 |
| Precursor fiber: Filament diameter | μm | 11.7 | 11.7 | 11.7 | 11.7 | 11.7 |
| Number of filaments | Filaments | 24000 | 24000 | 24000 | 24000 | 24000 |
| oxidized fiber: Specific gravity | g/cm³ | 1.35 | 1.35 | 1.35 | 1.32 | 1.39 |
| First carbonizing furnace: Highest temperature | ° C. | 600 | 600 | 640 | 600 | 600 |
| Second carbonizing furnace: Inlet temperature | ° C. | 600 | 600 | 1000 | 600 | 600 |
| Second carbonizing furnace: Highest temperature | ° C. | 1650 | 1650 | 1650 | 1650 | 1650 |
| Second carbonizing furnace: Residence time | min. | 2.7 | 2.7 | 2.7 | 2.7 | 2.7 |
| Second carbonizing furnace: Tension | mg/dtex | 281 | 94 | 200 | 193 | 191 |
| Carbonization step: Integral quantity of heat | J · h/g | 102 | 102 | 110 | 102 | 102 |
| Carbonization step: Temperature gradient | ° C./min | 389 | 389 | 241 | 389 | 389 |
| Carbon fiber bundle fineness | tex | 1600 | 1600 | 1600 | 1580 | 1620 |
| Strand tensile strength (TS) | MPa | — | 4450 | 4600 | — | 4300 |
| Strand tensile modulus (TM) | GPa | — | 273 | 278 | — | 275 |
| X-Ray crystallite size (Lc) | Å | — | 19.6 | 21.3 | — | 19.6 |
| X-Ray crystal orientation degree | % | — | 81.2 | 81.4 | — | 81.8 |
| Specific gravity | g/cm³ | — | 1.74 | 1.72 | — | 1.71 |
| Fiber diameter | μm | — | 6.8 | 6.9 | — | 6.9 |
| Formula (1) Lc/d | — | — | 2.9 | 3.1 | — | 2.8 |
| Formula (2) TS*d*Lc | ×10⁵ | — | 5.9 | 6.8 | — | 5.8 |
| Formula (3) TS*d*TM | ×10⁶ | — | 8.3 | 8.8 | — | 8.2 |
| CF Fluff quality | — | x | ○ | Δ | x | ○ |
| Composite material: 0TS Development rate | % | — | 91.2 | 90.5 | — | 90.2 |
| Composite material: 0TM | GPa | — | 158 | 160 | — | 159 |
| Composite material: IPSS | MPa | — | 75 | 70 | — | 75 |

Examples 8 to 10 and 12

A prepreg was prepared using the carbon fiber obtained in Example 3 and an epoxy resin composition obtained by mixing the below-mentioned resins in the proportion shown in Table 5.

Polyether sulfone and an epoxy resin in the proportion shown in Table 5 were provided, and the polyether sulfone was added to the epoxy resin, and the resultant mixture was stirred using a planetary mixer at 120° C. for 60 minutes to oriented so that the fiber mass per unit area became 190 g/m², preparing a fiber-reinforced substrate layer in a sheet form. The resin films were respectively laminated on both surfaces of the prepared fiber-reinforced substrate layer, and the resultant laminate was heated and pressed under conditions at the impregnation temperature shown in Table 5 and at a pressure of 0.2 MPa, preparing a unidirectional prepreg having a carbon fiber content of 65% by mass.

TABLE 5

|  |  |  | Example 8 | Example 9 | Example 10 | Example 11 | Example 12 | Example 13 |
|---|---|---|---|---|---|---|---|---|
| Carbon fiber |  |  | Example 3 | Example 3 | Example 3 | Example 3 | Example 3 | Example 7 |
| Resin component | jER828 | wt % | 38 | 36 | 35 | — | — | — |
|  | EX201 | wt % | — | — | — | — | 8 | 8 |
|  | jER604 | wt % | 25 | 25 | 24 | 27 | — | — |
|  | MY0600 | wt % | — | — | — | 31 | 15 | 15 |
|  | 34TGDDE | wt % | — | — | — | — | 26 | 26 |
|  | PES | wt % | 8 | 10 | 12 | 18 | 15 | 15 |
|  | 44DDS | wt % | 22 | 21 | 21 | 22 | 22 | 22 |

TABLE 5-continued

|  |  | Example 8 | Example 9 | Example 10 | Example 11 | Example 12 | Example 13 |
|---|---|---|---|---|---|---|---|
| PA12 | wt % | 7 | — | — | 10 | 14 | 14 |
| PA1010 | wt % | — | 8 | 8 | — | — | — |
| Resin viscosity (80° C.) | Pa·sec | 18 | 39 | 62 | 41 | 381 | 381 |
| Resin viscosity (120° C.) | Pa·sec | 1.6 | 4.5 | 2.9 | 24.3 | 33.3 | 33.3 |
| Impregnation temperature | ° C. | 120 | 125 | 130 | 125 | 135 | 135 |
| Water absorption | % | 1.8 | 2.2 | 2.5 | 3.9 | 4.8 | 2.6 |
| GIc | J/m$^2$ | 379 | 395 | 417 | 472 | 626 | 476 |

<Resin Composition>
(Epoxy Resin)

- jER828: Bisphenol A epoxy resin, jER828 (trade name), manufactured by Mitsubishi Chemical Corporation (difunctional)
- EX201: Glycidyl ether epoxy resin, EX-201 (trade name), manufactured by Nagase Chemtex Corporation (difunctional)
- jER604: Glycidylamine epoxy resin, jER604 (trade name), manufactured by Mitsubishi Chemical Corporation (tetra functional)
- MY0600: Glycidylamine epoxy resin, Araldite MY0600 (trade name), manufactured by Huntsman Advanced Materials K.K.
- 3,4'-TGDDE: Tetraglycidyl-3,4'-diaminodiphenyl ether (synthesized by the method described below)

(Synthesis of 3,4'-TGDDE)

Into a four-neck flask equipped with a thermometer, a dropping funnel, a condenser, and a stirrer was charged 1,146.2 g (12.0 mol) of epichlorohydrin, and the temperature in the flask was increased to 70° C. while purging the flask with nitrogen, and 200.2 g (1.0 mol) of 3,4'-diaminodiphenyl ether dissolved in 1,000 g of ethanol was dropwise added to the epichlorohydrin over 4 hours. The resultant mixture was stirred for another 6 hours to complete the addition reaction, obtaining N,N,N',N'-tetrakis(2-hydroxy-3-chloropropyl)-3,4'-diaminodiphenyl ether. Subsequently, the temperature in the flask was reduced to 25° C., and 480.0 g (6.0 mol) of a 48% aqueous NaOH solution was dropwise added to the mixture in the flask over 2 hours, and the resultant mixture was stirred for another one hour. After completion of the cyclization reaction, ethanol was distilled off, and the resultant residue was extracted with 400 g of toluene and washed twice with a 5% aqueous solution of sodium chloride. Toluene and epichlorohydrin were removed from the organic layer under a reduced pressure to obtain 361.7 g (yield: 85.2%) of a brown viscous liquid. 3,4'-TGDDE which is a main product had a purity of 84% (HPLC area %).

(Curing Agent)

- 4,4'-DDS: Aromatic amine curing agent, 4,4'-diaminodiphenyl sulfone, SEIKACURE S (trade name), manufactured by Wakayama Seika Kogyo Co., Ltd.

(Epoxy Resin-Soluble Thermoplastic Resin)

- PES: Polyether sulfone, PES-5003P (trade name), manufactured by Sumitomo Chemical Co., Ltd.; average particle diameter: 20 μm (Epoxy Resin-Insoluble Thermoplastic Resin Particles)

- PA12: Polyamide 12 resin particles (VESTSINT2158; average particle diameter: 20 μm; manufactured by Daicel-Evonik Ltd.)
- PA1010: Polyamide 1010 resin particles (VESTSINT9158; average particle diameter: 20 μm; manufactured by Daicel-Evonik Ltd.)

Example 11

A prepreg was prepared using the carbon fiber obtained in Example 3 and an epoxy resin composition obtained by mixing the above-mentioned resins in the proportion shown in Table 5.

Polyether sulfone and an epoxy resin in the proportion shown in Table 5 were provided, and half of the polyether sulfone was added to the epoxy resin, and the resultant mixture was stirred using a planetary mixer at 120° C. for 60 minutes to dissolve the polyether sulfone in the epoxy resin. Then, the temperature was lowered to 80° C., and the remaining half of polyether sulfone, a curing agent, and epoxy resin-insoluble thermoplastic resin particles were added and the resultant mixture was mixed for 30 minutes to prepare an epoxy resin composition. The viscosities of the obtained epoxy resin at 80° C. and at 120° C. are shown in Table 5.

Using the obtained epoxy resin composition, a unidirectional prepreg was prepared in the same manner as in Example 9.

Example 13

A unidirectional prepreg was prepared in substantially the same manner as in Example 12 except that the carbon fiber obtained in Example 7 was used.

With respect to the unidirectional prepregs obtained in Examples 8 to 13, a water absorption and an interlaminar fracture toughness (GIc) were evaluated in accordance with the methods described below. All the prepregs in Examples 8 to 13 using the carbon fiber of the invention were a prepreg having a low water absorption, irrespective of the viscosity of the epoxy resin composition used, and having the carbon fiber substrate well impregnated with the epoxy resin composition. Further, in all the Examples, a carbon fiber composite material having satisfactorily excellent interlaminar fracture toughness was obtained.

Particularly, in Examples 11 to 13 using the epoxy resin composition containing the insoluble thermoplastic resin particles in an amount of 10% by mass or more, although the epoxy resin composition had a resin viscosity as high as more than 10 Pa·sec at the time of the impregnation, the prepreg was well impregnated with the resin even at a relatively low impregnation temperature by virtue of using the carbon fiber of the invention, so that a carbon fiber composite material having very excellent interlaminar fracture toughness of more than 450 J/m$^2$ was obtained.

<Water Absorption>

The impregnation properties of a fiber substrate with a resin were evaluated in terms of a water absorption of a prepreg. The lower the obtained water absorption of the prepreg, the more excellent the impregnation properties with the resin.

The obtained prepreg was cut into a square having a side of 100 mm, and a mass ($W_1$) of the square prepreg was measured. Then, in a desiccator, the prepreg was placed into water. The pressure in the desiccator was reduced to 10 kPa or less to replace air inside the prepreg by water. The prepreg was removed from the water, and water was wiped from the surface of the prepreg, and a mass ($W_2$) of the resultant prepreg was measured. From these measured values, a water absorption was determined by making a calculation using the formula below. The water absorption is preferably 5% or less.

Water absorption (%)=$[(W_2-W_1)/W_2] \times 100$ $W_1$: Mass of the prepreg (g)
$W_2$: Mass of the prepreg after absorbing water (g)

<Interlaminar Fracture Toughness Mode I (GIc)>

The unidirectional prepreg was cut into squares having a side of 360 mm, and then they were laminated to prepare two laminates in which 10 layers were laminated in the 0° direction. For generating an initial crack, a release sheet was disposed between the two laminates, and they were combined to obtain a prepreg laminate having a laminate construction $[0]_{20}$. Using a general vacuum autoclave molding method, the laminate was subjected to molding under conditions at a pressure of 0.59 MPa and at 180° C. for 2 hours. The obtained molded material (fiber-reinforced composite material) was cut into a size having a width of 12.7 mm×a length of 304.8 mm, obtaining a test specimen for interlaminar fracture toughness mode I (GIc).

As a test method for GIc, using a double cantilever beam interlaminar fracture toughness test method (DCB method), a test was conducted in which a precrack (initial crack) was generated 12.7 mm from the end of the release sheet, and then the crack was further caused to propagate. At a point in time when the crack propagation length from the end of the precrack reached 127 mm, the test was completed. The crosshead speed of the test specimen tensile tester was 12.7 mm/minute, and the measurement was conducted at n=5.

The crack propagation length was measured from both edge faces of the test specimen using a microscope, and, by measuring a load and a crack opening displacement, a GIc was calculated by an integration method.

Comparative Example 11

A prepreg was prepared in substantially the same manner as in Example 8 except that the carbon fiber obtained in Comparative Example 3 was used. The prepreg obtained in Comparative Example 11 was impregnated with the same epoxy resin composition under the same conditions as in Example 8, but was a prepreg which has a high water absorption, as compared to the prepreg in Example 8 using the carbon fiber of the invention, and which is not satisfactorily impregnated with the resin. Further, the interlaminar fracture toughness was low and unsatisfactory, as compared to that in Example 8.

Comparative Example 12

A prepreg was prepared in substantially the same manner as in Example 10 except that the carbon fiber obtained in Comparative Example 3 was used. The prepreg obtained in Comparative Example 12 was impregnated with the same epoxy resin composition under the same conditions as in Example 10, but was a prepreg which has a very high water absorption, as compared to the prepreg in Example 10 using the carbon fiber of the invention, and which is not satisfactorily impregnated with the resin. Further, the interlaminar fracture toughness was low and unsatisfactory, as compared to that in Example 10.

Comparative Example 13

A prepreg was prepared in substantially the same manner as in Example 12 except that the carbon fiber obtained in Comparative Example 3 was used. The prepreg obtained in Comparative Example 13 was impregnated with the same epoxy resin composition under the same conditions as in Example 12, but was a prepreg which has an extremely high water absorption, as compared to the prepreg in Example 12 using the carbon fiber of the invention, and which is not satisfactorily impregnated with the resin.

For improving the impregnation properties with the resin, the impregnation conditions were changed to conditions at an impregnation temperature of 150° C. and at a pressure of 0.2 MPa, and heating and pressing were further performed under such conditions to attempt preparation of a unidirectional prepreg. As a result, a prepreg having a water absorption of 4.5% was able to be obtained, but the impregnation temperature was too high, and therefore the obtained prepreg was a prepreg having such low draping properties that the handling properties were poor. Further, the composite material using the prepreg obtained under conditions at an impregnation temperature of 150° C. had an interlaminar fracture toughness of 507 J/m², which is 100 J/m² or more lower than that in Example 12 using the same resin composition.

TABLE 6

|  |  |  | Comparative Example 11 | Comparative Example 12 | Comparative Example 13 |
|---|---|---|---|---|---|
| Carbon fiber |  |  | Comparative Example 3 | Comparative Example 3 | Comparative Example 3 |
| Resin component | jER828 | wt % | 38 | 35 | — |
|  | EX201 | wt % | — | — | 8 |
|  | jER604 | wt % | 25 | 24 | — |
|  | MY0600 | wt % | — | — | 15 |
|  | 34TGDDE | wt % | — | — | 26 |
|  | PES | wt % | 8 | 12 | 15 |
|  | 44DDS | wt % | 22 | 21 | 22 |
|  | PA12 | wt % | 7 | — | 14 |
|  | PA1010 | wt % | — | 8 | — |

TABLE 6-continued

|  | | Comparative Example 11 | Comparative Example 12 | Comparative Example 13 |
|---|---|---|---|---|
| Resin viscosity (80° C.) | Pa · sec | 18 | 62 | 381 |
| Resin viscosity (120° C.) | Pa · sec | 1.6 | 2.9 | 33.3 |
| Impregnation temperature | ° C. | 120 | 130 | 135 |
| Water absorption | % | 5.5 | 8.5 | 15 |
| GIc | J/m$^2$ | 365 | 383 | — |

What is claimed is:

1. A carbon fiber which simultaneously satisfies the following formulae (1), (2), (A), and (B):

$$Lc/d \leq 2.9 \tag{1}$$

$$TS \times d \times Lc > 6.0 \times 10^5 \tag{2}$$

$$75 \leq \text{X-ray crystal orientation degree (\%)} \leq 81.9 \tag{A}$$

$$1.72 \leq \text{specific gravity (g/cm}^3) \leq 1.76 \tag{B}$$

wherein:
Lc is an X-ray crystallite size (Å),
d is a filament diameter (μm), and
TS is a strand tensile strength (MPa),
and which satisfies:
the strand tensile strength of the carbon fiber is 4,700 MPa or more, and
the X-ray crystallite size of the carbon fiber is 19 to 21 Å.

2. The carbon fiber according to claim 1, which further satisfies the following formula (3):

$$TS \times d \times TM > 9.5 \times 10^6 \tag{3}$$

wherein:
TS is a strand tensile strength (MPa),
d is a filament diameter (μm), and
TM is a strand tensile modulus (GPa).

3. A prepreg which is obtained by impregnating the carbon fiber according to claim 2 with a matrix resin.

4. A fiber-reinforced composite material comprising the carbon fiber according to 2 and a matrix resin.

5. A prepreg which is obtained by impregnating the carbon fiber according to claim 1 with a matrix resin.

6. A fiber-reinforced composite material comprising the carbon fiber according to claim 1 and a matrix resin.

7. The carbon fiber according to claim 1, wherein the strand tensile strength is 4,700 to 5,200 MPa.

* * * * *